United States Patent

Melvin

[15] 3,675,129

[45] July 4, 1972

[54] DIFFERENTIALLY COHERENT PHASE SHIFT KEYED DIGITAL DEMODULATING APPARATUS

[72] Inventor: William J. Melvin, Costa Mesa, Calif.

[73] Assignee: Collins Radio Company, Cedar Rapids, Iowa

[22] Filed: May 13, 1970

[21] Appl. No.: 36,742

[52] U.S. Cl. .............................. 325/320, 178/67, 328/133, 329/110
[51] Int. Cl. ....................................................... H04l 27/22
[58] Field of Search ........................ 178/67, 66, 69.5 R, 88; 325/320, 30; 328/133, 155; 329/110; 331/1 A

[56] References Cited

UNITED STATES PATENTS

| | | | |
|---|---|---|---|
| 3,485,949 | 12/1969 | De Haas | 325/320 |
| 3,447,085 | 5/1969 | De Haas et al. | 178/67 |
| 3,401,339 | 9/1968 | Kluever et al. | 325/30 |
| 3,371,279 | 2/1968 | Lender | 178/67 |
| 3,341,776 | 9/1967 | Doelz et al. | 178/67 |
| 3,289,082 | 11/1966 | Shumate | 325/320 |
| 2,980,858 | 4/1961 | Grondin et al. | 178/69.5 |

*Primary Examiner*—Robert L. Richardson
*Assistant Examiner*—Peter M. Pecori
*Attorney*—Bruce C. Lutz and Robert J. Crawford

[57] ABSTRACT

A digitally implemented demodulating system for use in detecting a multitone differentially coherent phase shift keyed received signal. A plurality of reference tones are sequentially generated and separated into in-phase and quad-phase components. These components are multiplied by the input signal and stored in a plurality of accumulators equal to twice the number of received tones to obtain the X and Y components of each received tone. Substantially the same circuitry is then used to measure the phase of each received tone with respect to a test angle after which the reference is updated to have the same phase as the received tone in preparation for the next detection operation. Recovery of the detection information is obtained by testing the polarity of the X and Y accumulators.

13 Claims, 22 Drawing Figures

DIFFERENTIALLY COHERENT PHASE SHIFT KEYED DIGITAL DEMODULATING APPARATUS

This invention relates generally to the decoding of differentially coherent phase shift keyed modulation signals, tones, and more specifically to the decoding of such tones by digital means.

One of the most efficient and rapidly growing means of transmitting data from one point to another is through the use of phase shifted tones. More specifically, the tone is divided up into equal and consecutive time intervals known generally as time synchronous division of the tone. Within each time interval, referred to herein as a frame, the one is caused to have a particular phase with respect to some reference phase. For example, if two bits of information, each of which can be binary "1" or a binary "0," are to be encoded in each frame of the tone, the said tone can have a phase relation with the reference phase of either 45°, 135°, 225°, or 315°, depending upon the particular combination of the two bits being encoded. Each of these phases are spaced apart by 90° and are identified herein as phasor positions. When two data bits are encoded on a tone, four phasor positions are possible since there are four possible combinations of "0's" and "1's" of the two data bits. The The tone within a given time frame, however, can have only one phase.

While the reference phase can be in the form of a separate tone, it is more usually the phase of the preceding phasor. Thus, if a given phasor contains data bits which require a phase relation of 45° with said reference phase then said phasor will be generated in such a way that its phase will lead the phase of the previous phasor by 45°. Reference is made to U. S. Pat. No. 2,905,812 issued Sept. 22, 1959 to Doelz et al and entitled "High Information Capacity Phase Pulse Multiplex System" for a more detailed discussion of the use of phasors as a means of encoding information thereon for transmission purposes.

By proper frequency spacing, several of such tones can be simultaneously transmitted over an appropriate medium such as a telephone line, for example, and then decoded at the receiver. Such decoding at the receiver is accomplished generally by supplying the received composite signal, which includes all of the tones, to a filter which is tuned to the frequency of a single desired tone. Said composite signal is supplied to said filter for a period of time during each frame which is equal to the period of the frequency spacing between tones. During this period of time, known as the driving period, all of the tones except the tone to be filtered will shift in phase with respect to the tuned center frequency of the filter an integral number of cycles so that the energy supplied to the filter during a first half of this driving period is substantially cancelled by the energy supplied to the filter during the other half of the driving period. Thus all of the tones, except that particular tone whose frequency is equal to the tuned frequency of the filter, are effectively blocked by the filter. For a further detailed description of the use of a multiplicity of time synchronous, phase modulated tones, reference is made to the aforementioned U. S. Pat. No. 2,905,812.

The aforementioned means for encoding information on tones is known as a differentially coherent phase shifted modulation system.

The means by which such modulation and demodulation have been effected up to the present time have been largely analog in nature. However, if equipments and techniques are to remain competitive, technological advances must be utilized when feasible. For example, over the last twenty years vacuum tubes designs have yielded to discrete component transistors and printed circuit card designs. Transistors and printed circuits have in turn yielded to integrated circuits and thin film hybrid designs. Equipments employing the three foregoing type components and circuits are generally analog in nature since a digitalized implementation would be quite large, quite complex, and quite expensive. However, recent advances in monolithic circuit array technology (MOS) have made it possible to reduce the size, increase the reliability and decrease the cost of many formerly integrated circuit implemented equipments. Said MOS devices are, by their nature digital functional arrays, they facilitate a digital or sampled data implementation of analog functions.

It is a primary object of the invention to provide an improved circuit for demodulating a differentially coherent phase shift keyed signal.

A further object of this invention is the measurement of the phase of a received data tone relative to a reference phase and using this measured phase to update said reference in order to greatly simplify the detection or conversion of phase to binary data.

In accordance with the invention there is provided a means for receiving a differentially coherent phase shifted signal in analog form and converting such analog signal into a sequence of binary words which represent the amplitudes of successive samples of said received composite signal, and which are identified herein as sine magnitude words. Such sequences of sine magnitude words are then multiplied in parallel paths by quadrature forms of a reference signal which are generated locally as a sequence of binary words. The last-mentioned sequence of binary words represents successive phase angles of the reference signal and is identified herein as phase words. These phase words are then converted to a sequence of corresponding sine magnitude binary words (in quadrature form) before multiplication with the digitalized received signal occurs. As a result of such multiplication, X and Y components, representing the phase angle between the received signal and the reference signal, are produced and stored in appropriate storage means. Other means are provided to update the phase of the reference signal during the time interval of the frame currently being received so that it will coincide with the phase of the received composite signal and be ready to act as the phase reference for the next received phasor.

Such updating is accomplished essentially by comparing the phase of the reference signal with the stored X and Y components after multiplication has been completed in a given frame, noting the difference in phase angle between said reference signal and the received reference signal and then changing the phase of said reference signal to coincide with that of the received composite signal. Consequently, when the next frame of the composite signal is received, the reference signal will have a phase equal to the phase of the immediately preceding frame of the received composite signal and can be used in a direct manner; i.e., can be multiplied directly with the received composite signal to obtain new X and Y components in the accumulator. These new X and Y components are direct indicators of the two encoded data bits located in that frame of the received composite signal. The cycle then begins anew in that the phase of the reference signal is updated to coincide with the phase of the composite signal during the currently received frame.

In accordance with a feature of the invention the reference signal is updated by generating a binary word whose value is equal to the phase difference between the phasor currently being received and said reference signal, and then adding such value to the sequence of phase words representing said reference signal to cause the phase thereof to be coincident with that of the received phasor in preparation for the reception and decoding of the next phasor to be received.

In accordance with another feature of the invention common logic means is employed both to multiply the incoming composite signal by the reference signal and also to update the phase of said reference signals in the manner described above.

In accordance with a third feature of the invention either a single tone or a multi-tone differentially coherent phase shifted signal can be demodulated by the structure of the invention. In the case of the multi-tone composite signal, the driving time; i.e., the time interval over which the received composite signal is multiplied by the reference signal, must be equal to the period of the frequency spacing between the tones making up the composite tone.

The above mentioned and other objects and features of the invention will be more fully understood from the following detailed description thereof when read in conjunction with the drawings in which.

Figure 1:
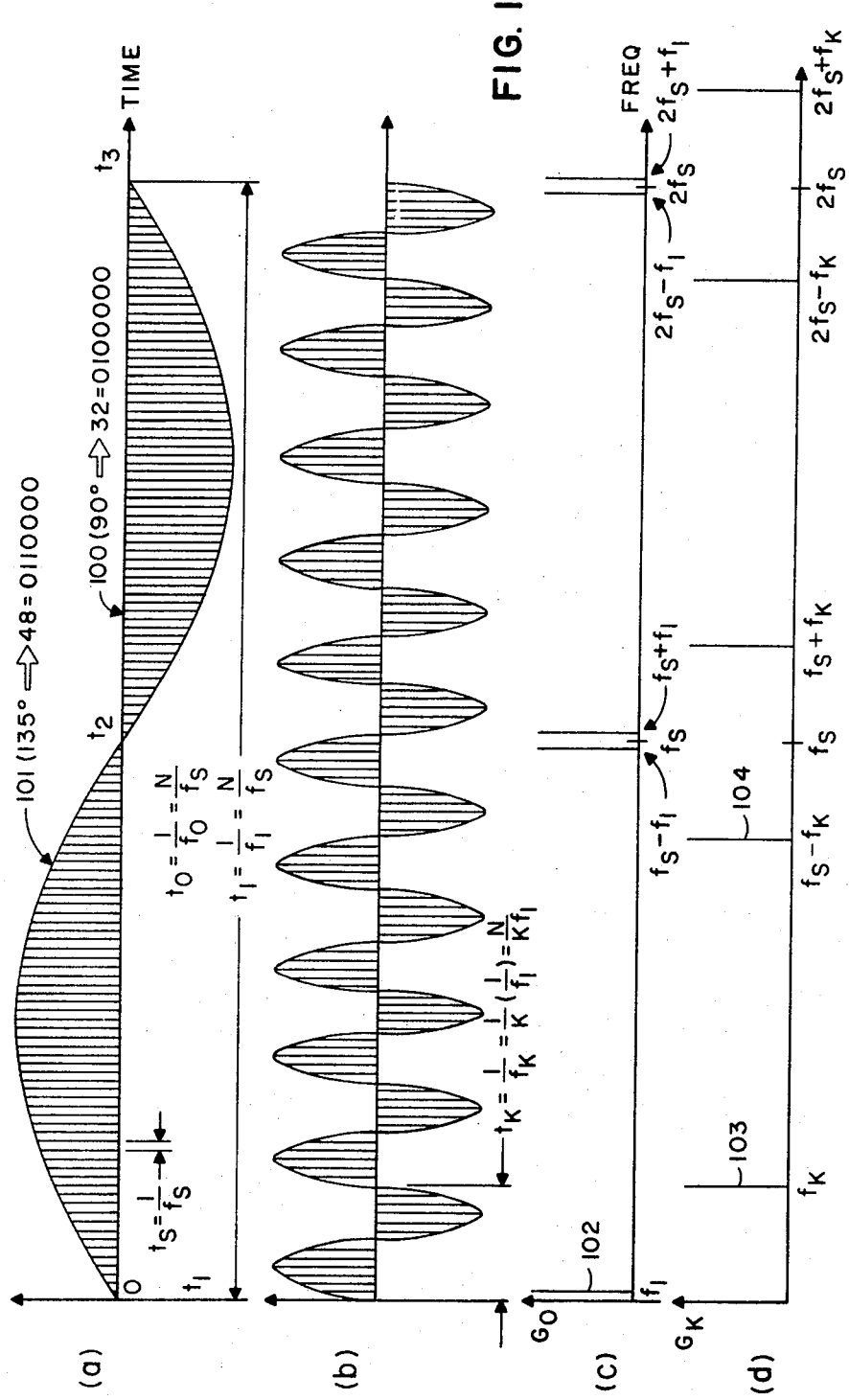
FIG. 1 shows waveforms illustrating how a sine wave can be represented by a sequence of binary words which represent either phase angle of the sine wave or amplitude of the samplings of the sine wave, and also illustrating how a sine wave of a higher multiple frequency can be represented by the selection of every $N^{th}$ one of said sequence of binary words.

The specification is organized in the following manner:
I. GENERAL BACKGROUND
  A. DIGITAL REPRESENTATION OF SINE WAVES—FIG. 1
  B. DEFINITIONS
II. GENERAL DISCUSSION OF INVENTION
  A. VECTOR DIAGRAM ANALYSIS—FIGS. 2, 3
  B. GENERAL LOGIC—FIGS. 3, 4, 5
  1. TIMING LOGIC—FIGS. 4, 5, 10, 18, 19, 20, 21
  2. DRIVE FUNCTION—FIGS. 4, 5, 6
  3. PHASE MEASUREMENT LOGIC AND FUNCTION—FIGS. 4, 5, 7, 8
  4. PHASE UPDATE LOGIC AND FUNCTION—FIGS. 4, 5, 7, 9, 10
  5. DATA DETECTOR LOGIC AND FUNCTION—FIGS. 4, 5, 6, 11
III. DETAILED DISCUSSION OF INVENTION
  A. DRIVING LOGIC AND TIMING—FIGS. 6, 8, 12, 13, 20
  B. PHASE MEASUREMENT LOGIC AND TIMING
    1. GENERATION OF TIMING AND DRIVING SIGNALS—FIGS. 7, 8, 22
    2. GENERATION OF TEST ANGLE INCREMENTS—FIGS. 7, 8, 14
  C. PHASE UPDATE LOGIC AND TIMING—FIGS. 5, 7, 8, 9, 10, 21

D. DATA DETECT LOGIC AND TIMING—FIGS. 4, 5, 6, 8, 11, 15, 16, 17, 20. It is noted that the first portion of the above outline relating to representation of a sine wave by digital means is essentially a brief review of subject matter known in the art, but which will greatly facilitate an understanding of the invention. A more detailed discussion of such representation can be found in a co-pending application filed June 16, 1969 by William J. Melvin, Ser. No. 833,460, now Pat. No. 3,497,599 and entitled "Digitalized Tone Generator."

I. GENERAL BACKGROUND

A. DIGITAL REPRESENTATION OF SINE WAVES

There are a number of ways that a sine wave can be represented. More specifically a sine wave can be represented in an analog manner as an alternating current or voltage. A sine wave can also be presented in some coded manner such as for example a series of evenly spaced pulses which contain different amounts of energy such that when they are filtered through an appropriate filter, a sine wave signal is detected. In FIG. 1a the vertical lines can represent such evenly spaced pulses.

A third means of representing a sine wave is by a sequence of binary words, which occur time synchronously, that is to say at evenly spaced time intervals, and each of which has a value representative of the amplitude of the sine wave at that particular point in time. Appropriate decoding means are used to decode the binary word into pulses which are then passed through a low pass filter to form an analog sine wave.

A fourth method of depicting a sine wave is by means of a series of successive binary words which can be time synchronous in nature with each binary word having a value representing the phase of a cycle of the sine wave being generated. More specifically the number of degrees of phase incremented by each successive binary word is determined by the number of binary words occurring within a given cycle of the sine wave. For example, assume that it is desired to represent a sine wave of frequency $f_o$ by 128 phase divisions per cycle. Thus each increment of phase represented between successive binary words is equal to 360°/128 or about 2.8°.

As a specific example of the above, assume that the binary word, 0 0 0 0 0 0 0, represents the 0° phase position of a cycle of the sine wave. The binary word 0 0 0 0 0 0 1, which has a decimal value of 1, represents the first phase increment of 2.8°. The binary word 0 0 1 0 0 0 0, which has a decimal value of 16, represents the 45° mark in the cycle. The binary number 0 1 0 0 0 0 0, which has a decimal value of 32, represents the 90° mark of the sine wave, and so on.

Reference is made to the following chart which shows the correspondence between phase angle of a cycle and the binary numbers representative thereof when a cycle is divided into 128 phase increments.

CHART A

| Phase Angle Increment = 360°/128 = 2.8° — I | Represented by Binary Number |
|---|---|
| 0×I = 0° or 360° | 0 0 0 0 0 0 0 = 0 |
| 1×I | 0 0 0 0 0 0 1 = 0 1 |
| 2×I | 0 0 0 0 0 1 0 = 2 |
| 3×I | 0 0 0 0 0 1 1 = 3 |
| 4×I | 0 0 0 0 1 0 0 = 4 |
| 5×I | 0 0 0 0 1 0 1 = 5 |
| 6×I | 0 0 0 0 1 1 0 = 6 |
| 7×I | 0 0 0 0 1 1 1 = 7 |
| 8×I = 22½° | 0 0 0 1 0 0 0 = 8 |
| 9×I | 0 0 0 1 0 0 1 = 9 |
| 10×I | 0 0 0 1 0 1 0 = 10 |
| 11×I | 0 0 0 1 0 1 1 = 11 |
| 12×I | 0 0 0 1 1 0 0 = 12 |
| 13×I | 0 0 0 1 1 0 1 = 13 |
| 14×I | 0 0 0 1 1 1 0 = 14 |
| 15×I | 0 0 0 1 1 1 1 = 15 |
| 16×I = 45° | 0 0 1 0 0 0 0 = 16 |
| 32×I = 90° | 0 1 0 0 0 0 0 = 32 |
| 48×I = 135° | 0 1 1 0 0 0 0 = 48 |
| 64×I = 180° | 1 0 0 0 0 0 0 = 64 |

| | |
|---|---|
| 80×1 = 225° | 1 0 1 0 0 0 0 = 80 |
| 96×1 = 270° | 1 1 0 0 0 0 0 = 96 |
| 112×1 = 315° | 1 1 1 0 0 0 0 = 112 |
| 127×1 = 357.2° | 1 1 1 1 1 1 1 = 127 |

It will be noted that the generation of the binary words representing the phase of a sine wave cycle is a linear function of time. That is to say, the value of periodically occurring binary words representing the phase of a sine wave cycle increases proportionally with time and is completely independent of variations of the sine wave amplitude.

One the other hand, a system of binary words representing periodic samplings of the amplitude of a sine wave, and which occur in a time synchronous manner will have a value proportional to a sine wave function and would be a non-linear function.

The important distinction between the linear function of phase representation of a sine wave and the non-linear function of amplitude representation of a sine wave is as follows. In the case of representation of phase by binary words the sine wave being represented can be phase shifted instantaneously simply by adding a binary number to the binary number representing a phase position in the sine wave cycle. For example assume that at a given instant in time the phase word 0 0 1 0 0 0 0, which equals 16 and represents the phase position 45°, is being generated. A phase shift of 90° can be effected simply by adding to the phase word the binary word representing 90°, which binary word is 0 1 0 0 0 0 0 and has a decimal value of 32, as can be seen from the foregoing chart.

This type of phase shift cannot easily be accomplished with binary words representing amplitudes of a sine wave since such a function is not linear.

It should be noted that to produce an analog sine wave the binary words representing the phase positions of the sine wave cycle must first be decoded, in an appropriate decoding means, into amplitude representing binary digits which in turn are decoded into pulses, the pulses then being filtered to produce the analog sine wave.

Returning again to FIG. 1a, assume that the vertical lines therein do not represent amplitude indicating pulses but rather represent a division of the sine wave into phase increments, with the binary number as shown in the above chart representing the phase of the cycle at a given point in time. As mentioned above, 128 phase division has been selected as a suitable division factor primarily because 128 is equal to $2^7$ which permits shifting of phase by a half cycle, a quarter cycle, or an eighth cycle simply by dividing by 2, 4, or 8, respectively.

Furthermore, the use of phase division of the sine wave signal as opposed to amplitude sampling representation permits easy generation of harmonics. For example, to generate the $K^{th}$ harmonic of the fundamental frequency $f_1$ of FIG. 1a it is only necessary to generate every $K^{th}$ binary number of the above chart. Thus, if it is desired to generate the 11$^{th}$ harmonic, then every 11$^{th}$ binary number of the above chart must be generated which in turn produces the sequence of binary numbers shown in Chart B below.

It is to be specifically noted that the same group of binary numbers is not necessarily regenerated each time the selection of binary numbers progresses through the 128 possible selections. For example, in generating the 11$^{th}$ harmonic, the decimal equivalents of the binary numbers selected are 0, 11, 22, 33, - - - 121 the first time through the 128 possible selections, and then are 4, 15, 26, 37 - - - etc., the second time through the 128 possible selections.

CHART B

| Phase Angle Increment for 11th Harmonic | Binary Representation |
|---|---|
| 0×1 | 0 0 0 0 0 0 0 = 0 |
| 11×1 | 0 0 0 1 0 1 1 = 11 |
| 22×1 | 0 0 1 0 1 0 1 = 22 |
| 33×1 | 0 1 0 0 0 0 1 = 33 |
| 44×1 | 0 1 0 1 1 0 0 = 44 |
| 55×1 | 0 1 1 0 1 1 1 = 55 |
| 66×1 | 1 0 0 0 0 1 0 = 66 |
| 77×1 | 1 0 0 1 1 0 1 = 77 |
| 88×1 | 1 0 1 1 0 0 0 = 88 |
| 99×1 | 1 1 0 0 0 1 1 = 99 |
| 110×1 | 1 1 0 1 1 1 0 = 110 |
| 121×1 | 1 1 1 1 0 0 1 = 121 |
| 4×1 | 0 0 0 0 1 0 0 = 4 |
| 15×1 | 0 0 0 1 1 1 1 = 15 |
| 26×1 | 0 0 1 1 0 1 0 = 26 |
| 37×1 | 0 1 0 0 1 0 1 = 37 |

If it is desired to generate the second harmonic, then every other binary number of the above chart must be generated. It is to be understood that regardless of whether the fundamental frequency $f_1$ is generated or the $K^{th}$ harmonic $Kf_1$ is generated, the rate of generation of the binary numbers is the same, as shown in the waveforms of FIGS. 1a and 1b.

It is apparent from the frequency spectrum charts of FIGS. 1c and 1d that as the frequency of the signal being sample increases while the sampling rate remains the same, the difference between the sampled and the sampling frequency decreases. Thus in FIG. 1c the difference frequency $f_s - f_1$ can be seen to be considerably larger than the difference frequency $f_s - f_k$ of FIG. 1d. The limiting factor, in accordance with Nyquist's theory, is that the sampling frequency should never become less than twice the sampled frequency. Thus $f_s$ should never be less than $2f_k$. If $f_s$ should become equal to, or less than $2f_k$, then the frequency $f_s - f_k$, represented by the line 104 in FIG. 1d, would move to the left while the frequency $f_k$, represented by the line 103, would in effect move to the right until the two would meet at the point where $f_s$ is equal to $2f_k$. If the sampling rate were to decrease further, then the two lines 103 and 104 would cross so that line 104 would move to the left of line 103, with resultant cross talk and distortion.

Thus the highest possible harmonic that can be obtained with a sampling rate equal to 128 times the sample frequency is the 63rd harmonic. If the 64th harmonic were attempted to be generated, the frequency of the sampling rate would be equal to twice the frequency of the signal being sampled (generated), and distortion and cross talk would result.

It will also be noted that the frequency spectrums of FIGS. 1c and 1d are cyclical. More specifically, peaks equal to the sum and difference of the sampled and sampling frequencies occur around each integral mutliple of the sampling frequency. Thus, for example, in FIG. 1c the sum and difference frequencies of the sampling frequency $f_s$ and the sampled frequency $f_1$ occur around the fundamental sampling frequency $f_s$. At the second harmonic of the sampling frequency $2f_s$, there occurs the sum and difference of the said second harmonic of the sampling frequency $2f_s$ and the sampled frequency $f_1$. A similar observation can be made in the frequency spectrum of FIG. 1d.

B. DEFINITIONS

Certain symbols will be used in the specification to denote certain types of binary words. Such symbols are listed below:

| | |
|---|---|
| $\phi_0, \phi_1, \phi_2, -\phi_{17}$ | Each $\phi_n$ represents a 7 bit binary word which indicates the phase angle of the tone being generated at any given time. |
| $A_0, A_1, A_2, -A_{17}$ | Each $A_n$ represents a 7 bit binary word indicative of the amplitude of the tone at the corresponding phase angle ($\phi_n$). |
| $\phi'_0, \phi'_1, \phi'_2 - \phi'_{16}$ | Represent the test angles in binary form which are added to each of the reference signals to update the phase of the respective reference signals to be the same as the phase of the currently received input signals in the currently received frame. |
| $k_1$ | Represents the binary increment added to each phase word $\phi_n$ each sample time to generate a tone in terms of $\phi_n$. |

II. GENERAL DISCUSSION OF INVENTION

A. VECTOR DIAGRAM ANALYSIS

Figure 2:
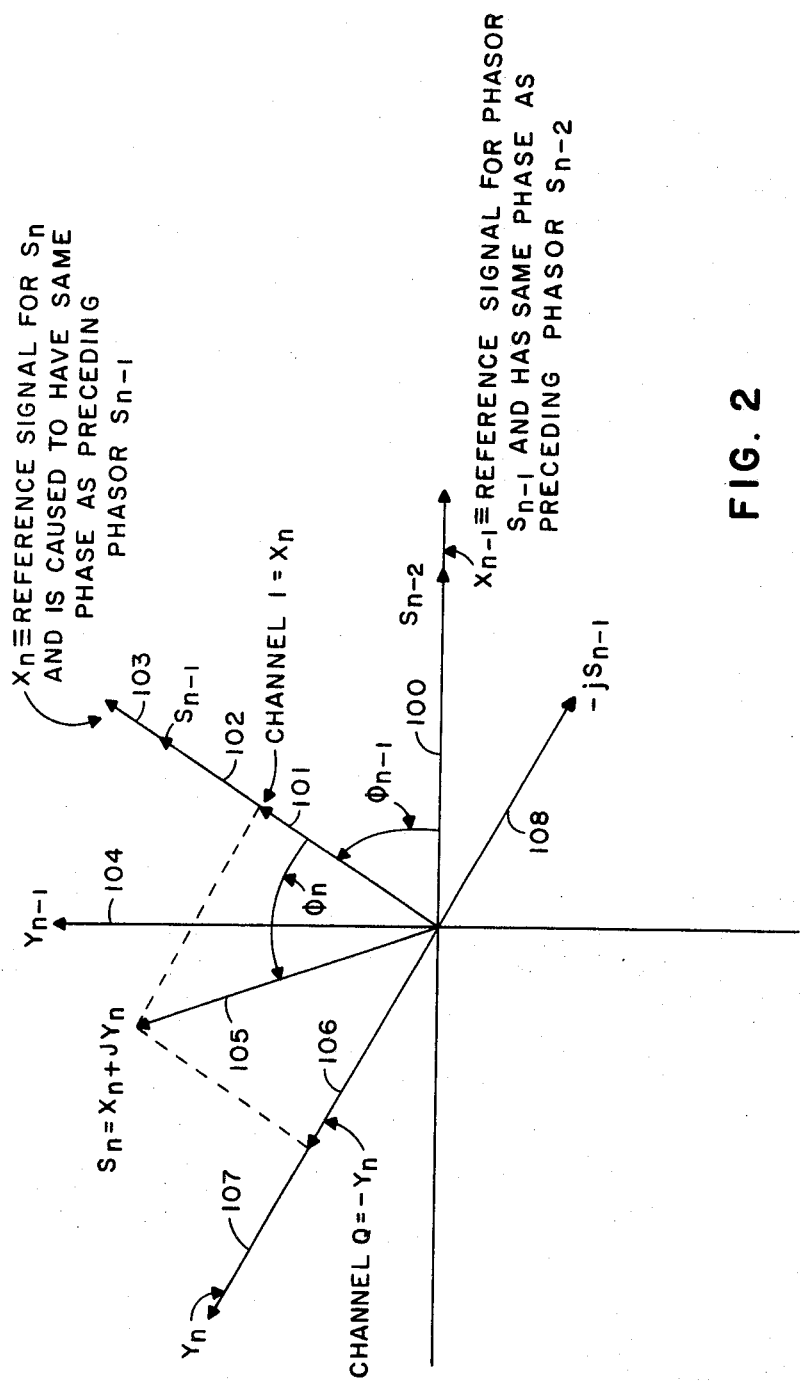
FIG. 2 illustrates the phase relation of successive phasors in accordance with the encoding of different combinations of pairs of bits thereon.
Figure 3:
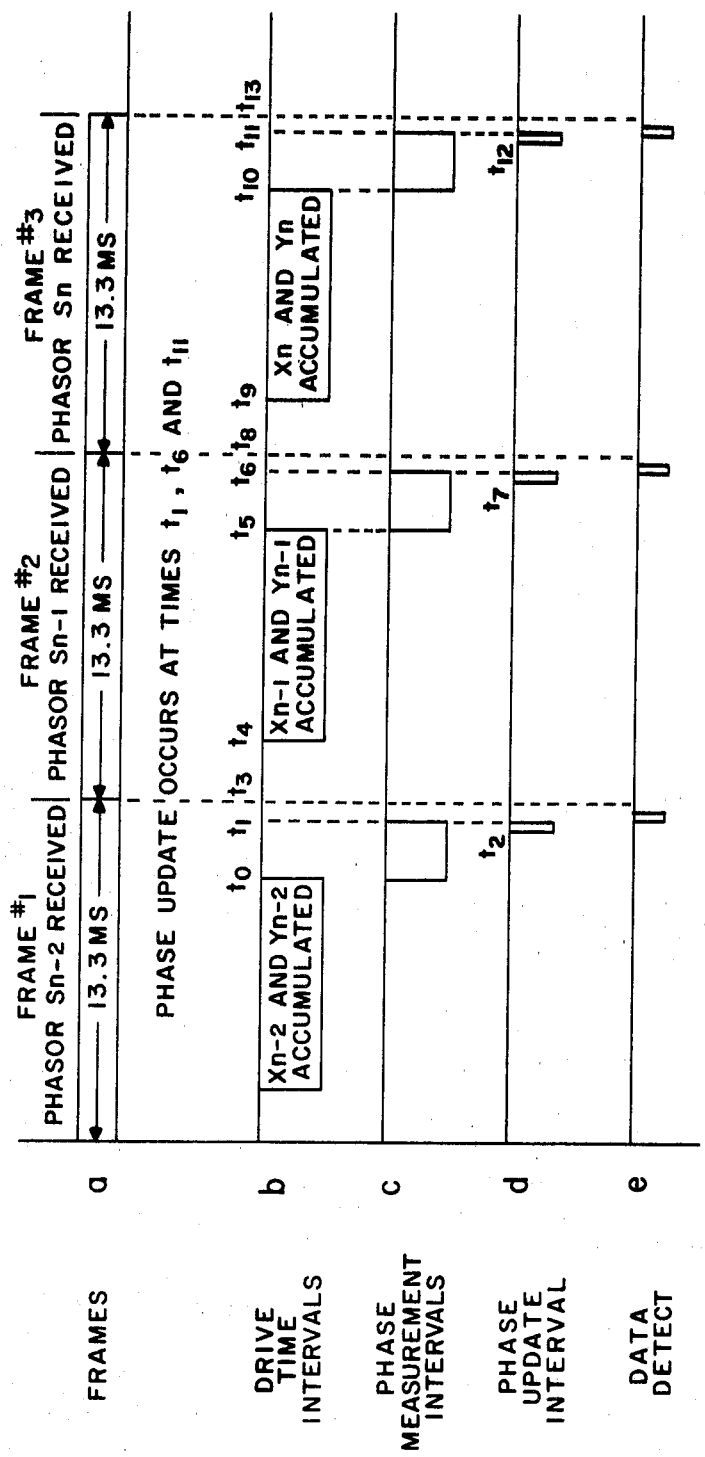
FIG. 3 illustrates successive data frames with the drive, phase measurement, phase update, and detect intervals.

In the vector diagram of FIG. 2 and also in the waveforms of FIG. 3, there is shown the general concept of advancing the phase of the reference signal each frame period to match the phase of the received phasor during that frame, so that the phase of the next received frame can be compared with the updated reference signal to provide a direct decoding of the information contained in said next received frame.

The vector diagram of FIG. 2 covers a time period of two received phasors. Since the reception of the signal involves a continuous reception of phasors with the reception of each phasor followed by an updating of the reference signal, it will be assumed that at a given point in time $t_3$, the vector $S_{n-2}$ has been received, the X and Y components thereof accumulated as indicated in FIG. 3b, and further that the reference signal has been updated so that its phase, at time $t_3$, coincides with the phase of phasor $S_{n-2}$.

Such a condition can be seen in FIG. 2 wherein the reference signal, represented by phasor 100, has been updated to agree in phase with the phasor $S_{n-2}$. The said vector 100 constitutes the phase reference for the next received phasor which will be designated as vector $S_{n-1}$. Thus when said next phasor $S_{n-1}$ occurs it can be decoded by taking the dot product between it ($S_{n-1}$) and the reference signal 100 to produce an X component designated as $X_{n-1}$, which is accumulated in an appropriate storage means to be described later. Such accumulation has a positive or a negative polarity which determines whether the data bit of one of the two channels represented by the phasor $S_{n-1}$ is a space or a mark.

The dot product of the phasor $S_{n-1}$ is also taken with the reference vector 104, which is in quadrature with vector 100, to obtain the Y axis projection of vector $S_{n-1}$, and thereby determines the data bit stored in the other channel of the two channels stored in phasor $S_{n-1}$.

At time $t_5$ in FIG. 3, the accumulations of the X and Y projections of vector $S_{n-1}$ upon vectors 100 and 104 are completed and are stored in appropriate storage means, as will be discussed later. During the time interval $t_5-t_6$ the difference in phase angle between the X axis reference vector 100 and the received phasor $S_{n-1}$ is measured as indicated in the waveform 3c. Such phase difference angle can be seen to be equal to $\phi_n$ in FIG. 2. Immediately prior to the completion of the measurement of phase difference angle $\phi_{n-1}$, the phase of reference signal 100 is updated during the time interval $t_7-t_6$ in waveform 3d so that the new reference signal has a phase as indicated by vector 103 in FIG. 2.

During time interval immediately after $t_6$ in FIG. 3e, the contents of the accumulators holding the X and Y components are read out by appropriate means in order to determine the nature of the bits stored in channel 1 and channel 2.

The next frame No. 3 begins at time $t_8$. Then during the time interval $t_9-t_{10}$ in FIG. 3b, designated as the drive time interval, the next received phasor $S_n$ (FIG. 2) is multiplied by the vectors 103 and 107 which represent the quadrature form of the updated reference signal, by dot product multiplication. Thus there is obtained the $X_n$ and $Y_n$ components of the newly received phasor $S_n$ with respect to the updated reference vector 103. It can be seen that the decoding of the phasor $S_n$ is made directly by dot product multiplication with the quadrature reference signals represented by vectors 103 and 107.

Next during the time period $t_{10}-t_{11}$, the phase angle $\phi_n$, between reference signal 103 and phasor $S_n$, is measured so that during the following time period $t_{12}-t_{11}$ the said reference signal can be updated to cause its phase to coincide with the phase of the phasor $S_n$ in preparation for the reception of the next phasor.

A general discussion on the entire invention including logic means for measuring the phase difference between the reference signal and the received phasor and for updating said reference signal will be set forth in the following section.

B. GENERAL LOGIC DIAGRAM

Figure 4:
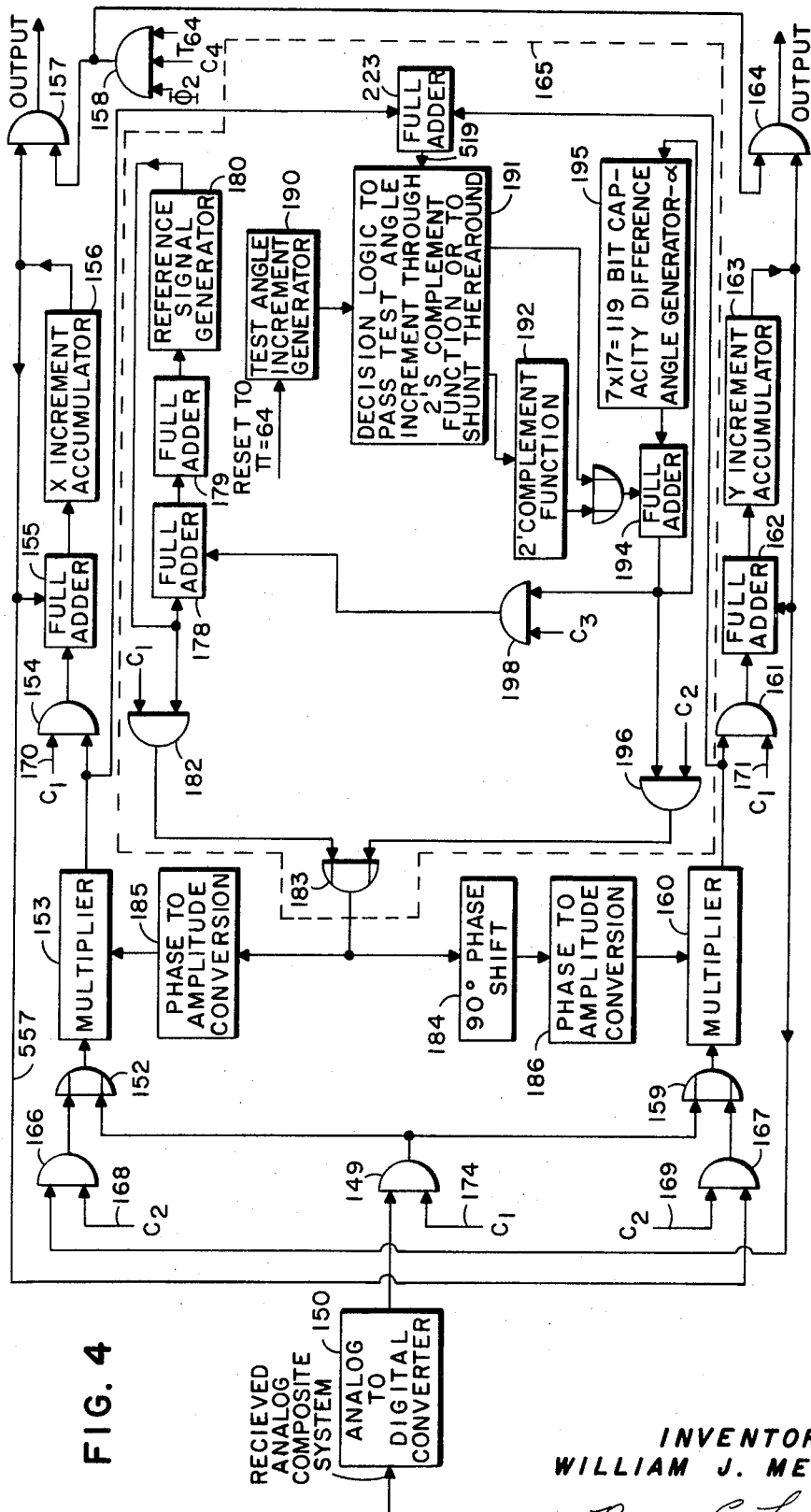
FIG. 4 is a functional block diagram of the demodulator.

The logic diagram of FIG. 4 is a diagram of the complete invention for demodulating a single tone. Many of the logic blocks shown in FIG. 4 are used for more than one function. More specifically, as discussed generally hereinbefore, there are four major functions which occur during each frame of received information. These functions are:

1. Driving Function
2. Phase Measurement Function
3. Phase Update Function
4. Data Detect Function It is to be understood that the four functions listed above utilize the digitalized form of the received and reference signals. For example, the driving function involves, for each cycle of the fundamental tone, 128 multiplications of the binary numbers which represent the amplitude of the received signal by the binary numbers which represent the amplitude of the phase reference signal. This multiplication may be completed by various circuits, one of which is shown in my copending application, Digitalized Multiplier, Ser. No. 14,151, filed Feb. 25, 1970 and assigned to the same assignee as the present invention. Similarly, the other three functions utilize digitalized techniques, but in somewhat different manner as will be discussed in the following paragraphs.

Figure 5:
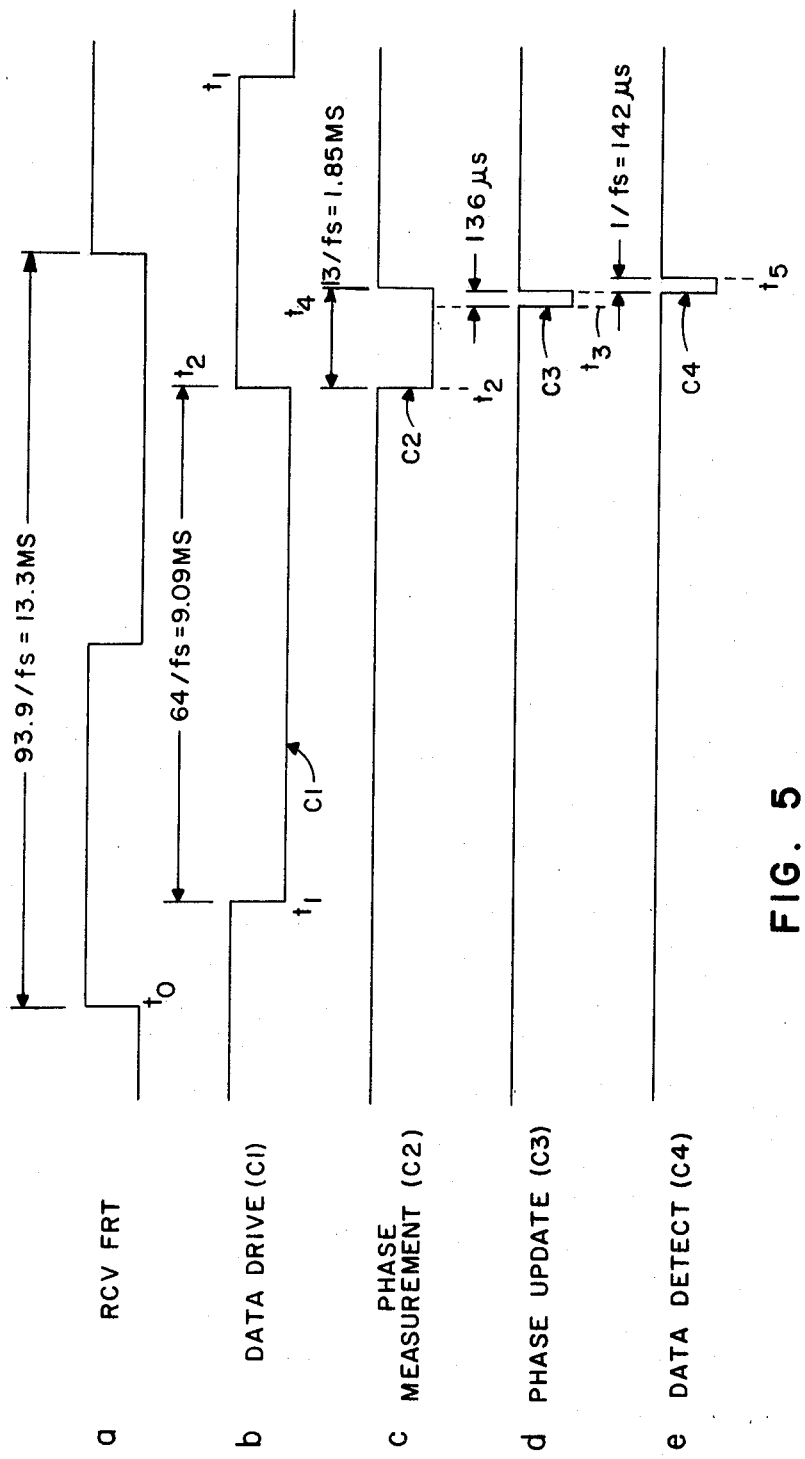
FIG. 5 is a timing diagram for data detection showing how the time in each frame is divided into the four major functions of the circuit including data drive, phase measurement, phase update, and data detect.

The timing relations of the above-listed four functions with respect to a frame are shown in part in FIG. 3 and in more detail in FIG. 5. It can be seen from the waveform of FIG. 5b that the data drive period occurs over a time interval $t_1-t_2$ which is defined as pulse C1. The pulse C1 is the first of the four control pulses to occur during a frame and has a length of 9.09 milliseconds. It is during this data drive interval that the incoming phasor is dot product multiplied by the phase reference signal, and the X and Y components accumulated in appropriate accumulators such as accumulators 156 and 163 of FIG. 4.

Immediately following the data drive period there occurs a phase measurement period over a time interval $t_2-t_4$, defined by a control pulse C2, which has a length of 1.85 milliseconds, as shown in the waveform of FIG. 5c. During the time interval C2, the difference between the reference signal and the received phasor is measured. During the latter portion of the phase measurement interval, the phase update function occurs, as shown in FIG. 5d, during the time interval $t_3-t_4$ upon the occurrence of the phase update control pulse designated C3, shown in FIG. 5d. Such phase update function advances the phase of the phase reference signal so that it is coincident with the phasor being received, thereby establishing the proper phase reference against which the phase of the next received phasor is to be compared by dot product multiplication.

The X and Y components stored in the accumulators 156 and 163 of FIG. 4 provide the means by which data is detected. In the detecting of such data, the timing pulse, designated as C4 in FIG. 5e, and having a length of 142 microseconds, functions to define the time intervals during which the X and Y binary numbers stored in accumulators 156 and 163 of FIG. 4 are read and transformed into d-c voltage values. These X and Y values are supplied to the inputs of flip-flop circuits in a manner to be described later each of which will assume one of their two possible states to designate the reception of a mark or a space in the two channels of data being transmitted.

1. TIMING LOGIC

At this point a general discussion of the timing means employed in the invention will be set forth. The discussion of the logic of the invention which then follows will be more readily and fully understood.

The timing in the present invention consists of two separate timing systems, one of them being relatively slow with respect to the other. The slow timing system is based on the frame time of the received composite signal, which frame time occurs at the rate of 75 frames per second. The various functions of operation are related to this frame time and are defined by the control pulses C1, C2, C3, and C4.

The fast timing system relates primarily to the phase words and the sine magnitude words, and more specifically to the bit and word rates of the phase reference signal, and the phase difference angles, as well as the accumulation of binary numbers in the X and Y increment accumulators.

Generally, it can be stated that the slow timing based on the frame period of the incoming composite signal defines periods within each frame during which certain operations are made on the digital phase and sine amplitude words, at the much higher bit and word rate of said digital words.

Figure 18:
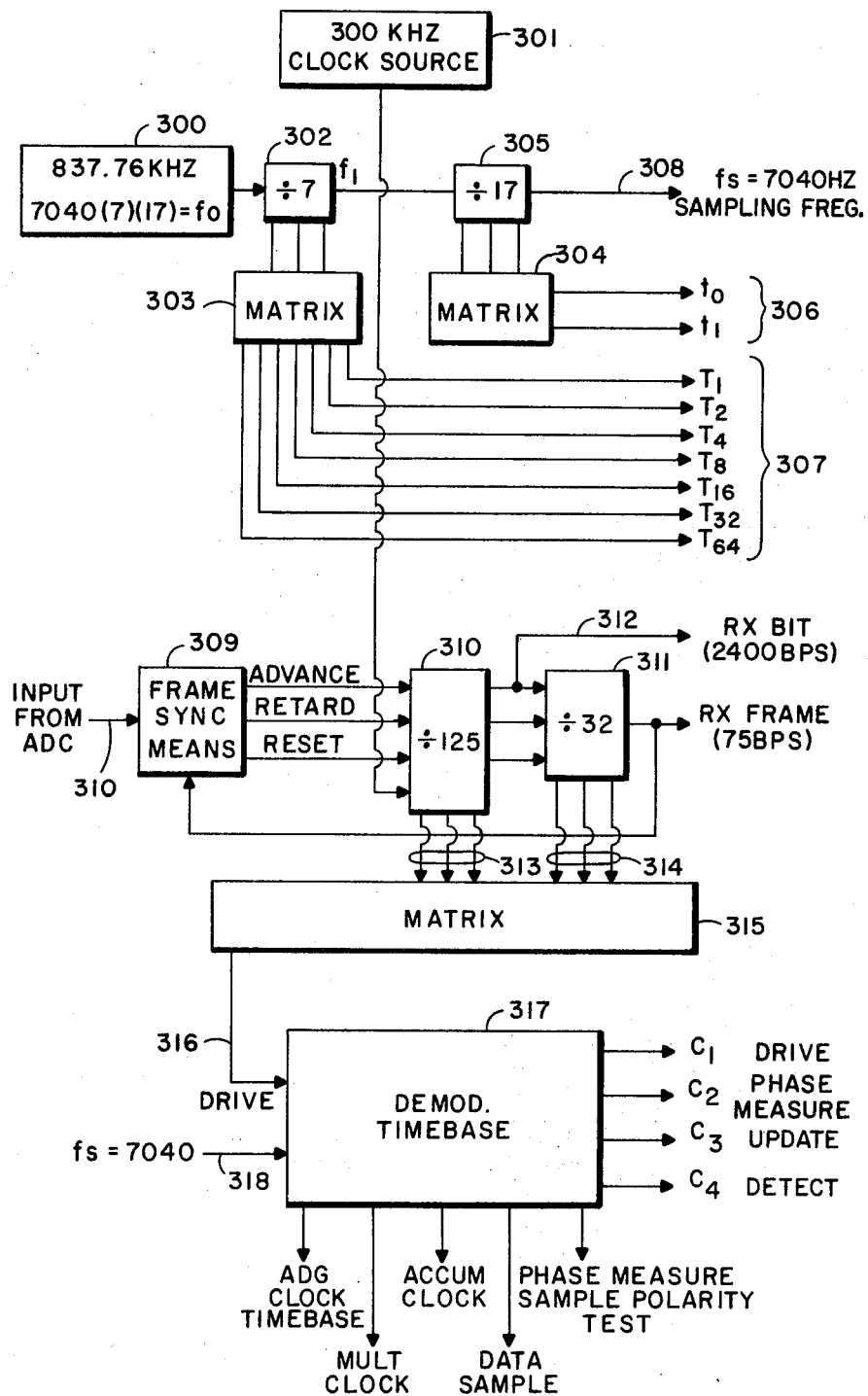
FIG. 18 is a functional block diagram illustrating the general timing requirements.

The generalized form of the timing systems is shown in FIG. 18. Some of the logic blocks in FIG. 18 relate only to the frame timing or slow timing and others relate only to the fast or digital word timing. A third group of blocks relate to both types of timing.

The two types of timing will first be discussed separately and then the interrelation of the two timing systems will be discussed.

The frame timing system consists of a 300 kHz clock source 301, a divide by 125 circuit 310, and a divide by 32 circuit 311. The divide by 125 circuit is constructed so that it will produce at output terminal 312 a 2,400 Hz clock signal, which is the number of bits received per second in the entire library of 16 data carrying tones comprising the received composite signal. Therefore, since there are sixteen tones each carrying two bits of data, the output of divider 310 is divided by 32 to provide a frame time which is 13.3 milliseconds in length and occurs at a rate of 75 frames per second. The total number of bits per second is equal to $75 \times 16 \times 2 = 2,400$.

In order to synchronize the outputs of dividers 310 and 311 with the actual frame transition occurrences of the incoming signal, there is provided a frame synchronizing means 309 to which is supplied the output of divider 311 and also the composite incoming signal. By suitable detecting means the frame transition time of the incoming signal is detected by the frame synchronizing means 309 and the output of said frame synchronizing means 309 then functions to adjust the count of the divider 310 so that the output of divider 311 is coincident with the frame transition time of the incoming composite signal.

The matrix 315 is constructed to respond to various counts of the outputs of dividers 310 and 311 to supply signals to the demodulator time base 317 through a group of interconnecting leads shown as a single lead 316.

The demodulator time base 317 is an arrangement of logic circuits which function to respond to the input signals supplied to matrix 315 to generate the four control pulses C1 – C4 shown in FIG. 5.

Also supplied to demodulator time base 317 via input lead 318 are the sampling pulses $f_s$ which are taken directly from the output of divide by 17 circuit 305 at the top of FIG. 18.

Figure 21:
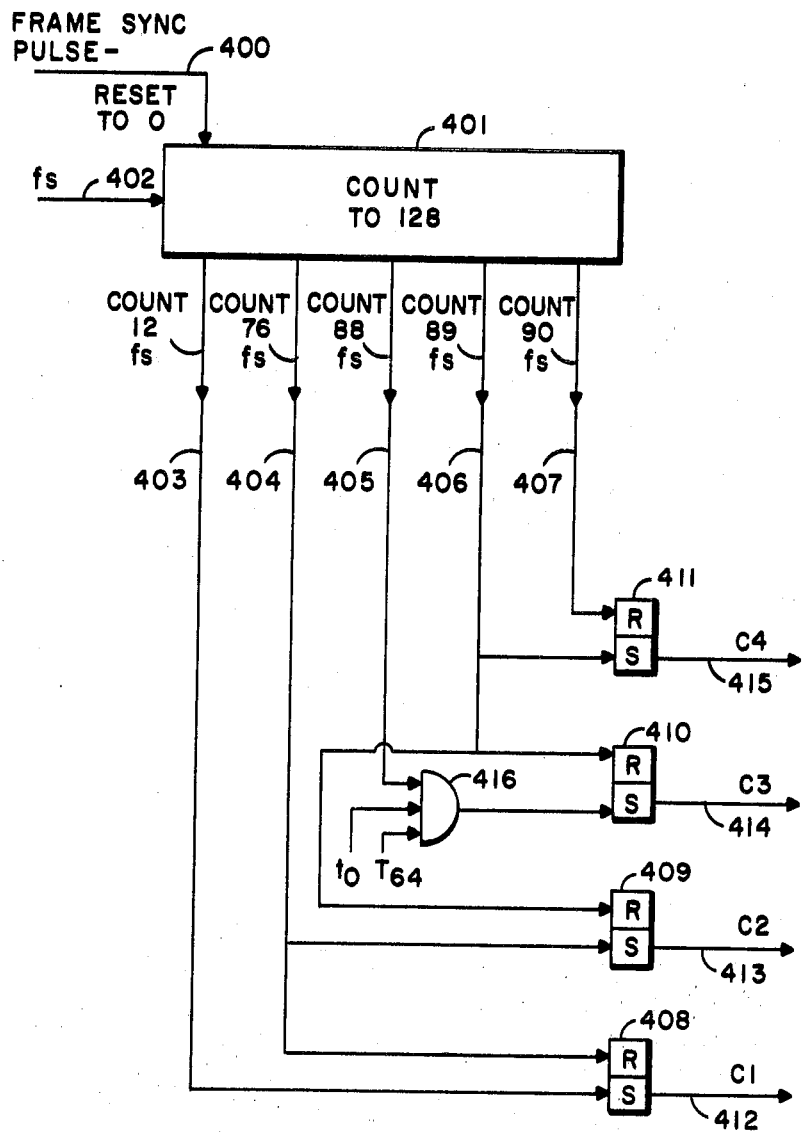
FIG. 21 is a logic diagram for generating the four modes.

Then, by logic means located within block 317, a part of which is shown in more detail in FIG. 21, the four control pulses C1 through C4, in conjunction with the outputs 306 and 307 of the high speed portion of the timing of FIG. 18, are employed to produce the following timing signals.

1. ADC Clock Time Base
2. Multiplier Coefficient Load Pulse
3. X and Y Accumulator Multiplier Input Clock Pulses
4. Test Polarity Output Pulse
5. Data Sampling Clock Pulse A more detailed discussion of the logic of FIG. 21 and the meaning and use of the various timing pulses will be taken up later herein. At this point a generalized discussion of the high speed timing will be set forth.

In FIG. 18 the basic logic blocks for producing the high speed timing include an 837.76 kHz source 300, the output signal of which is supplied to the cascaded arrangement of divide by seven circuit 302 and divide by 17 circuit 305. It can be seen that the output of the divide by 17 circuit 305 is the 7,040 Hz sampling frequency $f_s$.

Two matrices, 303 and 304, are connected to various stages of the divide by seven circuit 302 and divide by 17 circuit 305, respectively, to produce two groups of high speed signals. One of these signals identifies the time slots of each seven bit phase word and each sine magnitude word. The other group of signals identifies each of the 17 words associated with each of the 17 tones making up the composite signal.

These two groups of high speed timing signals are designated generally by the reference characters 306 and 307 of FIG. 18.

Figure 19:
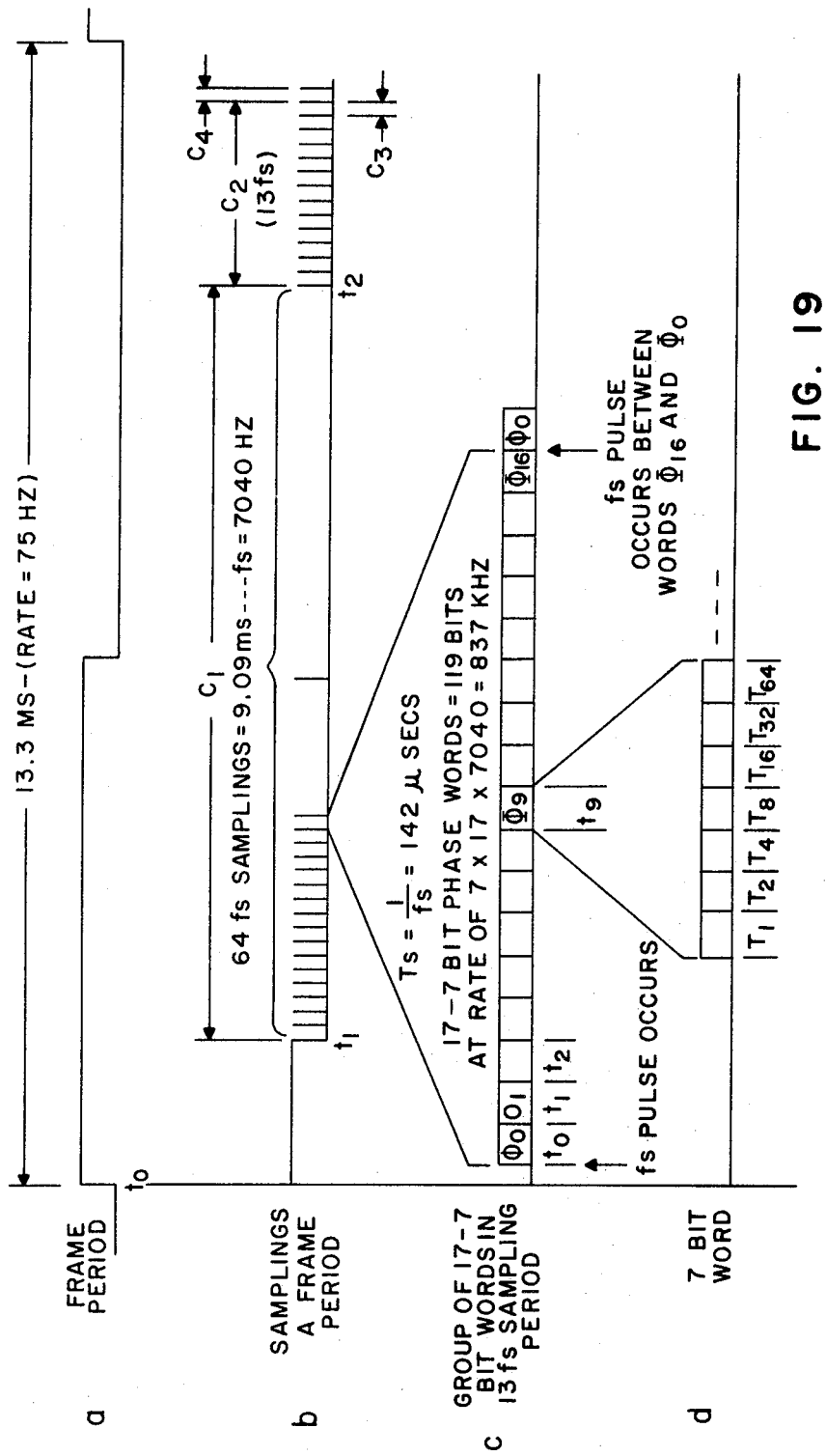
FIG. 19 is the reference timing diagram illustrating the bit per word, word per sample, and the sample per data frame nomenclature.

For a graphical representation showing the relation between the frame timing and the two groups of high speed output timing signals 306 and 307, reference is made to FIG. 19 which shows four waveforms $a, b, c,$ and $d$.

Waveform $a$ represents a received frame of data with each tone in said frame containing two data bits. It can be seen that the frame time length is 13.3 milliseconds and that the frame rate is 75 Hz.

The waveform $b$ of FIG. 19 illustrates 64 $f_s$ sampling periods that make up the C1 data drive control signal. Also shown in waveform $b$ is the phase measurement interval of C2, which consists of 13 $f_s$ sampling periods. The phase update period C3 and the data detect period C4 are each comprised of a single $f_s$ period.

Waveform c of FIG. 19 shows the word structure of a single $f_s$ sample period of the waveform $b$. More specifically, in waveform $c$ there are shown 17 seven-bit phase words which form a total of 119 bits. The bit rate, as these bits are moved from stage to stage in the various shift registers of the structure is $7 \times 17 \times 7,040$ or 837.76 kHz, which is supplied from clock pulse source 300 of FIG. 18.

Each of the phase words shown in waveform c of FIG. 19 consists of seven time slots as shown in the waveform $d$ of FIG. 19. These seven time slots are designated as $T_1, T_2, T_4, T_8, T_{16}, T_{32},$ and $T_{64}$, where the subscripts represent the number $2^N$, where N is the $N_{th}$ bit in the seven-bit word.

The word and bit time slots of the waveforms of FIGS. 19c and 19d pertain specifically to the words and bits of the phase reference signal generated in block 180 of FIG. 4 and also pertain to the test or difference angles generated in the test or difference angle generator 195 of FIG. 4. It can be seen that through the use of the timing signals of waveforms $c$ and $d$, each of the 119 bit time slots of each $f_s$ sampling period can be identified, and with a definite and known relationship to the $f_s$ sampling pulses. The time of occurrence of two $f_s$ sampling pulses is shown in waveform c of FIG. 19. It can be seen that these $f_s$ sampling pulses occur between phase words $\phi_{16}$ and $\phi_0$ and mark the time that each group of phase words, beginning with phase word $\phi_0$ is supplied to full adder 178 of FIG. 4.

To summarize, the time slots of waveforms $c$ and $d$ of FIG. 19 represent those time intervals at which the bits and words are circulated from the phase reference signal generating shift register 180 and into the input of full adder 178 of FIG. 4. Similarly such time slots represent the time that each of the seven bit difference angle words are supplied from difference angle generator 195 and into the input of full adder 194 of FIG. 4.

The sine magnitude words supplied from analog-to-digital converter 150 are also measured from the $f_s$ sampling pulses so that synchronization is maintained between the output of the analog-to-digital converter 150 and the outputs of reference signal generator 180 and the difference angle generator 195. As will be seen in more detail later, the circulation of the 21 bit words stored in the X and Y accumulators 156 and 163 and into the multipliers 160 and 153 during the phase measurement portion of the cycle are also referenced with respect to the $f_s$ sampling pulses so that synchronization is maintained with the output of the difference angle generator 195.

Similarly, the shifting of the 21 bits in the X and Y accumulators 156 and 163 through the full adders 155 and 162, where they are added to the output of multipliers 153 and 160 during the data drive period C1, are referenced to the $f_s$ pulses, so that synchronization is maintained between said X and Y increment accumulators, the outputs of the multipliers 153 and 160, and the output of the analog-to-digital converter 150.

Figure 20:
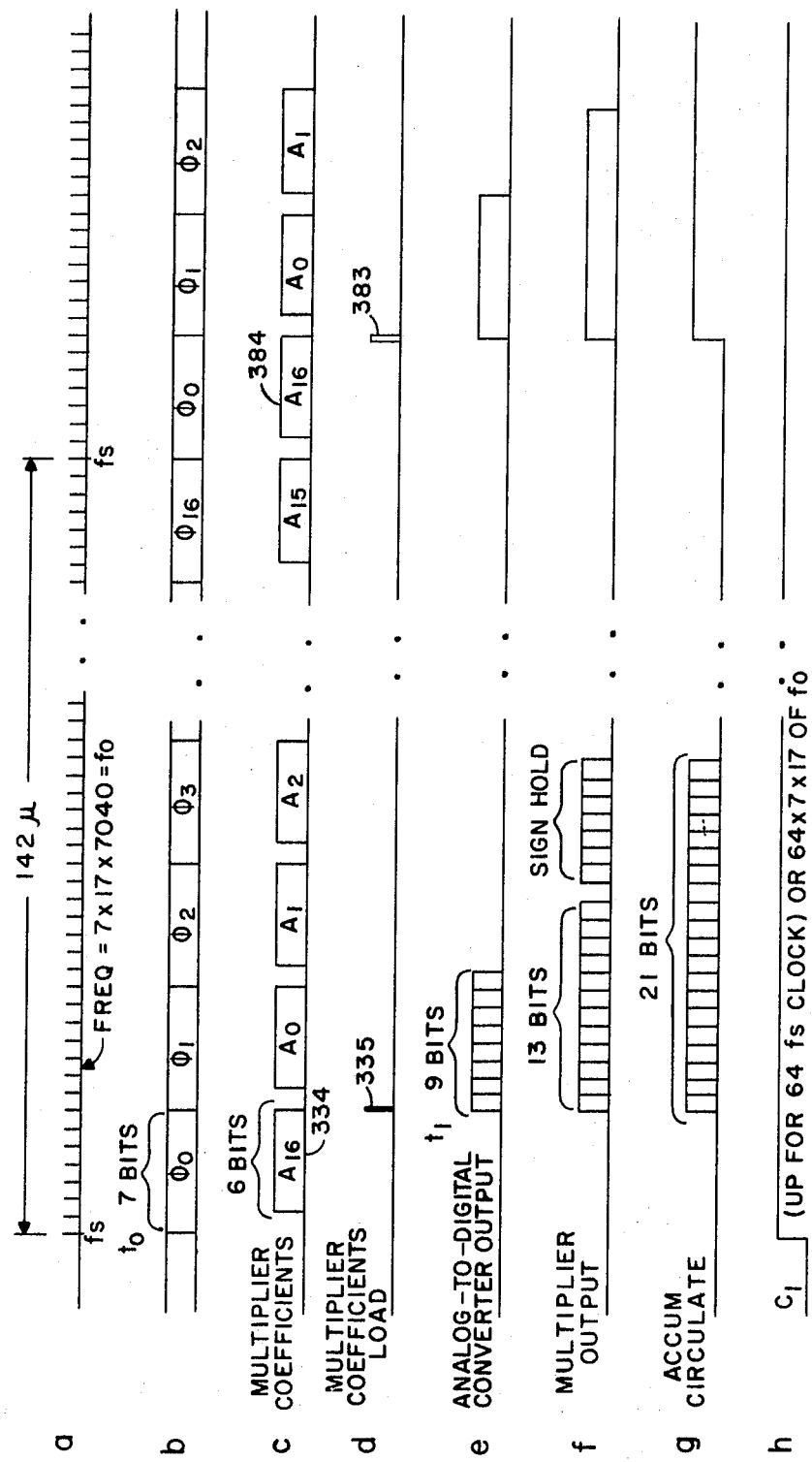
FIG. 20 illustrates the timing during the data drive mode.

Reference is made to FIG. 20 where the outputs of the aforementioned three logic units are shown in waveforms $e$, $f$, and $g$. It is to be noted that timing reference in waveforms $e$, $f$, and $g$ is with respect to the multiplier coefficient load pulse 335 of waveform $d$, which is in turn referenced to the $f_s$ pulse occurring at the beginning of time slot $t_o$. The reason for the seven bit delay between the $f_s$ pulse which occurs at time $t_o$ and the multiplier coefficient load pulse 335 of waveform $d$ is due to a seven-bit delay in the phase-to-amplitude converters 185 and 186 of FIG. 4.

Referring now to FIG. 21, there is shown that portion of the demodulator time base 317 of FIG. 18 which produces the control pulses C1 through C4 on output leads 412 through 415 respectively of FIG. 21.

A counter 401 having a count capacity of 128 functions to count the sampling pulses $f_s$ supplied thereto on input lead 402 and is reset to zero by each frame synchronizing pulse supplied thereto on input lead 400. The frame synchronizing pulses, as discussed above, mark the beginning of each frame of the 75 frame per second received composite signal, as shown in waveform $a$ of FIG. 19. Upon the reception of the twelfth $f_s$ pulse after the frame sync pulse occurrence, at time $t_1$ in waveform $b$ of FIG. 19, the drive control pulse C1 begins. The specific logic for generating C1 includes the count of 12 output lead 403 from counter 401 and flip-flop circuit 408. The said count of 12 will set flip-flop 408 or initiate the pulse C1 on output lead 412.

By definition the C1 period is 64 $f_s$ sample periods in length. Consequently, at the count of 76 by counter 401 flip-flop 408 is reset, thus terminating pulse C1. In FIG. 19 such termination is shown as occurring at time $t_2$ in waveform $b$.

Also at time $t_2$, the phase measurement period begins. More specifically, in FIG. 21 output lead 404 responds to the count of 76 in counter 401 to set flip-flop 409 which initiates the C2 control pulse on output lead 413. By definition said phase measurement time intervals lasts for 13 sampling periods. At the end of said 13 sampling periods; i.e., when counter 401 counts to 89, a signal is supplied from counter 401 via lead 406 to reset flip-flop 409, thus terminating the phase measurement.

Figure 10:
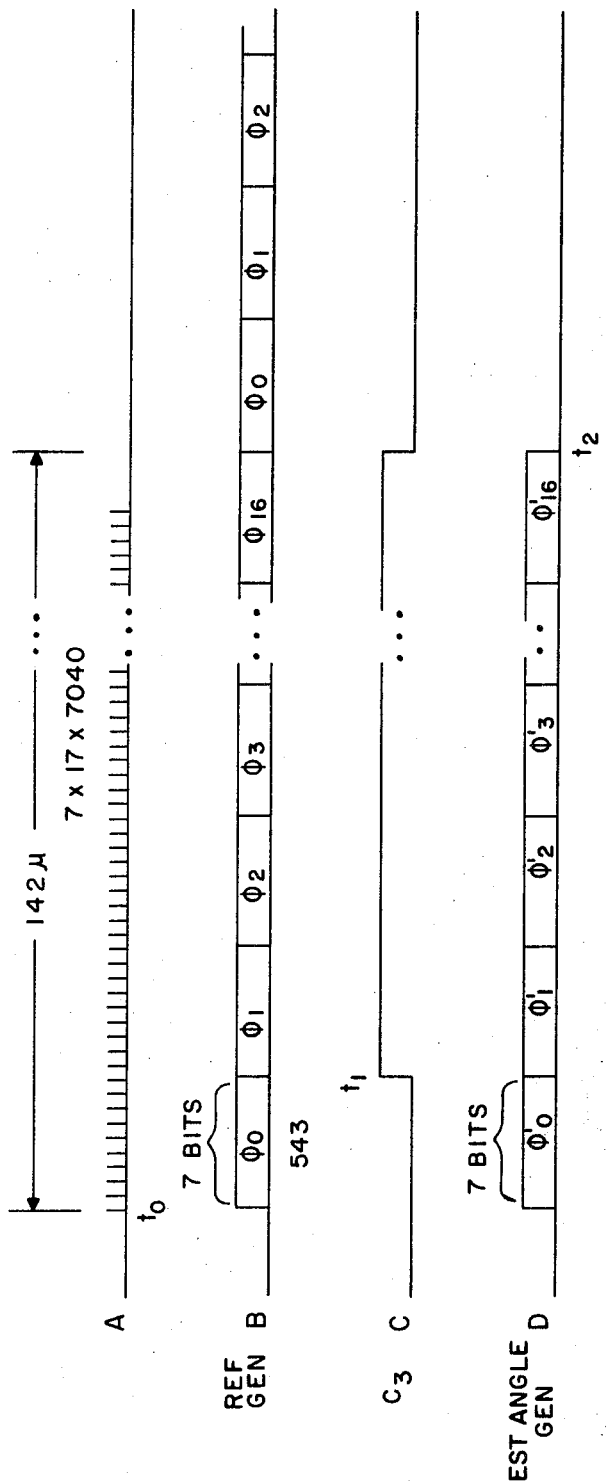
FIG. 10 is the timing required for the phase update mode.

The phase update period or C3, as can be seen from FIGS. 5, 10, and 19, occurs during the last sampling period of the phase measurement period and, more specifically, occurs during the last 16 word time slots of the last sampling period $t_s$ of the phase measurement function. Consequently, flip-flop 410 is set by coincidence of count 88 and the time slots representing the last bit $T_{64}$ of the first word $t_o$ of said sampling period. Thus, the phase update period effectively excludes the first word $t_o$, which is the Doppler correction word, from the phase update function. The reason for such exclusion is that the Doppler correction word does not incur a phase change. At the 89$^{th}$ count of counter 401 flip-flop 410 is reset, thus terminating the phase update pulse C3.

Simultaneously with the termination of the phase update pulse the count 89 from counter 401 initiates the data detect pulse C4 by setting flip-flop 411. One sampling time later, at the count of 90 from counter 401, flip-flop 411 is reset, thus terminating the data detect pulse C4.

The demodulator time base 317 of FIG. 18 also contains other logic which combines the C1 through C4 control pulses, the $t_o$ through $t_{16}$ word time slot pulses and the bit time slot defining pulses $T_1$–$T_{64}$, to effect the various high speed timing requirements needed for each of the four main functions. The timing associated with each of these functions will be described in detail later herein.

2. DRIVE FUNCTION

In FIG. 4 the logic employed during the drive function operates as follows. The analog composite signal is received by the analog-to-digital converter 150 which changes the analog composite signal containing a library of tones (or a single tone) into a sequence of binary words which represent the amplitude of the received signal taken at a sampling rate $f_s$. Assume that in the particular embodiment of the invention being described herein the received composite signal contains sixteen data containing tones and one Doppler effect correction tone.

It should perhaps be noted at this point that the sampling rate of the received composite signal is 7,040 Hz so that the stream of binary words being supplied to a first input of AND gate 149 occurs at the 7,040 Hz rate. The said AND gate 149 is opened; i.e., conductive, during the existence of a data drive pulse C1 (FIG. 5b) supplied to the other input 174 of AND gate 149, thereby permitting the said stream of binary words to be supplied to the parallel arrangement of OR gates 152 and 159, and then respectively to multipliers 153 and 160. For reasons that will be discussed in more detail later, each binary word supplied from the analog-to-digital converter 150 contains nine bits, of which eight bits represent the magnitude of the composite signal and one bit represents the polarity.

Also supplied to the multipliers 153 and 160 is the reference signal which is supplied thereto from reference signal generating source 180 through AND gate 182, OR gate 183, and then into two parallel paths; the first path extending through phase-to-amplitude converter 185 to multiplier 153, and the second path extending through 90° phase shift means 184, and phase-to-amplitude converter 186 to multiplier 160.

Thus, in effect, the reference signal generated as a phase word in logic 180 is supplied as two sequences of sine magnitude words, in quadrature form, to multipliers 153 and 160, respectively.

It is to be noted specifically that the reference signal is originally generated in block 180 as a phase word as defined herein, and consists of a sequence of binary words occurring at the sampling rate $f_s$, each of said binary words representing a phase angle of the sine wave being generated. This reference generates a phase word for each of 17 tones every $f_s$. This is accomplished by circulating the register 180 while simultaneously updating with the appropriate phase factor which is supplied to full adder 179. This is described in the co-pending application, Ser. No. 833,460, mentioned previously. The injection of the appropriate phase factor into full adder 179 will be assumed present and implemented as per the co-pending application for the remainder of this application.

The reason for generating the reference signal initially as a sequence of phase words is because the phase of the reference signal must be changed during each frame to coincide with the phase of the currently received phasor. Such changing of the phase of the reference signal has previously been generally described as updating the phase of the reference signal. As discussed in detail in the aforementioned referenced, co-pending application, Ser. No. 833,460 entitled "Digitalized Tone Generator," the changing of the phase of a signal represented by phase words is very easy to effect and simply involves the addition or subtraction of a binary word from the phase word. The changing of a phase of a sine wave represented by sine magnitude words, on the other hand, is quite complex.

In the multiplying process, however, the use of phase words is quite awkward so that it is necessary to convert the phase words into sine magnitude binary words before multiplication takes place. Such conversion occurs in the phase-to-amplitude converters 185 and 186, which produce at their output a series of five bit sine magnitude binary words which are, in effect, quadrature forms of the reference signal.

Thus to each of the multipliers 153 and 160 there is supplied two inputs. One of these inputs is the sequence of sine magnitude words representing the incoming composite signal. The other inputs to the multipliers are the five bit sine magnitude quadrature words representing the reference signals.

The outputs of multipliers 153 and 160 pass through AND gates 154 and 161, respectively, which are opened during the data drive time interval C1 and then into full adders 155 and 162, respectively. Also supplied to full adders 155 and 162 are the contents of the X and Y increment accumulators 156 and 163, respectively.

Consider now the operation of the full adder 155 and the X increment accumulator 156 specifically. Since the two binary words supplied to multiplier 153 are respectively an eight bit input from the converter 150 and a five bit input from the phase-to-amplitude converter 185 the output of multiplier 153 is a thirteen bit word which is supplied to one input of the full adder 155 through AND gate 154. The capacity of the X increment accumulator 156, however, is 21 bits for reasons that will be discussed later. Consequently, in order to perform addition in full adder 155, the multiplier 153 must be, and is constructed, so that an additional eight bits are added to the output thereof which function to stretch the polarity sign bit. Thus the outputs of both multiplier 153 and accumulator 156 consist of 21 bits which are supplied in bit synchronism with each other to the full adder 155, and at a word rate equal to the sampling rate $f_s$.

More specifically during each sampling interval $1/f_s$ the contents of the X increment accumulator 156 are circulated through full adder 155 in bit synchronism with the output of the multiplier 153, and with the output of said full adder then being supplied back into the X increment accumulator 156. In this manner, the X increment accumulator 156 is updated each sampling period $1/f_s$ at the 7,040 Hz rate mentioned hereinbefore.

The particular embodiment of the invention being described herein is constructed such that 64 circulations of the X increment accumulator occur during each data drive time; i.e., the sampling rate $f_s$ has been selected so that 64 sample periods thereof constitute the drive period, and further is equal to the period of the frequency spacing between the tones making up the library of tones in the composite signal. Consequently, all of the tones except that tone which is equal to the frequency of the reference signal will, in effect, be blocked by the function of the multipliers 153 and 160, and the accumulators 156 and 163, which combination really functions as a filter.

More specifically, during the driving period, all tones, except the tone to be filtered, will shift in phase with respect to the reference signal supplied from logic 180 an integral number of cycles so that the energy supplied to the filters (multipliers 153 and 160) during the first half portion of the driving period is substantially cancelled by the energy supplied to the filters during the later half portion of the driving period.

It should perhaps be noted at this point that in a multi-tone system several of the demodulators of the form shown in FIG. 4 are arranged in parallel with respect to the output of the analog-to-digital converter 150. Each demodulator functions to extract a different tone from the received composite signal. It is to be noted further, however, that a part of the circuit of FIG. 4 is common to all of these demodulators. Such common circuitry is that portion of FIG. 4 contained within the dash line block 165 and comprises in essence the means for measuring the phase angle between the reference signal of each of the demodulators and the phasor of the tone to be selected by that demodulator, and the means for updating the phase of each of said reference signals to coincide with the associated tone. The reference signal generator means 180 is also common to all of the demodulators as will be discussed later.

While no effort will be made to describe FIG. 6 in detail at this point, reference is made thereto to illustrate generally how a plurality of demodulators of the type shown in FIG. 4 are connected in parallel arrangement with common phase measurement and phase updating logic. A portion of such common logic is shown within the dash line block 201 and includes a pair of phase-to-amplitude converters 185' and 186' and a 90° phase shift circuit 184', which correspond respectively to the phase-to-amplitude converters 185 and 186 and the 90° phase shift circuit 184 of FIG. 4.

Figure 6:
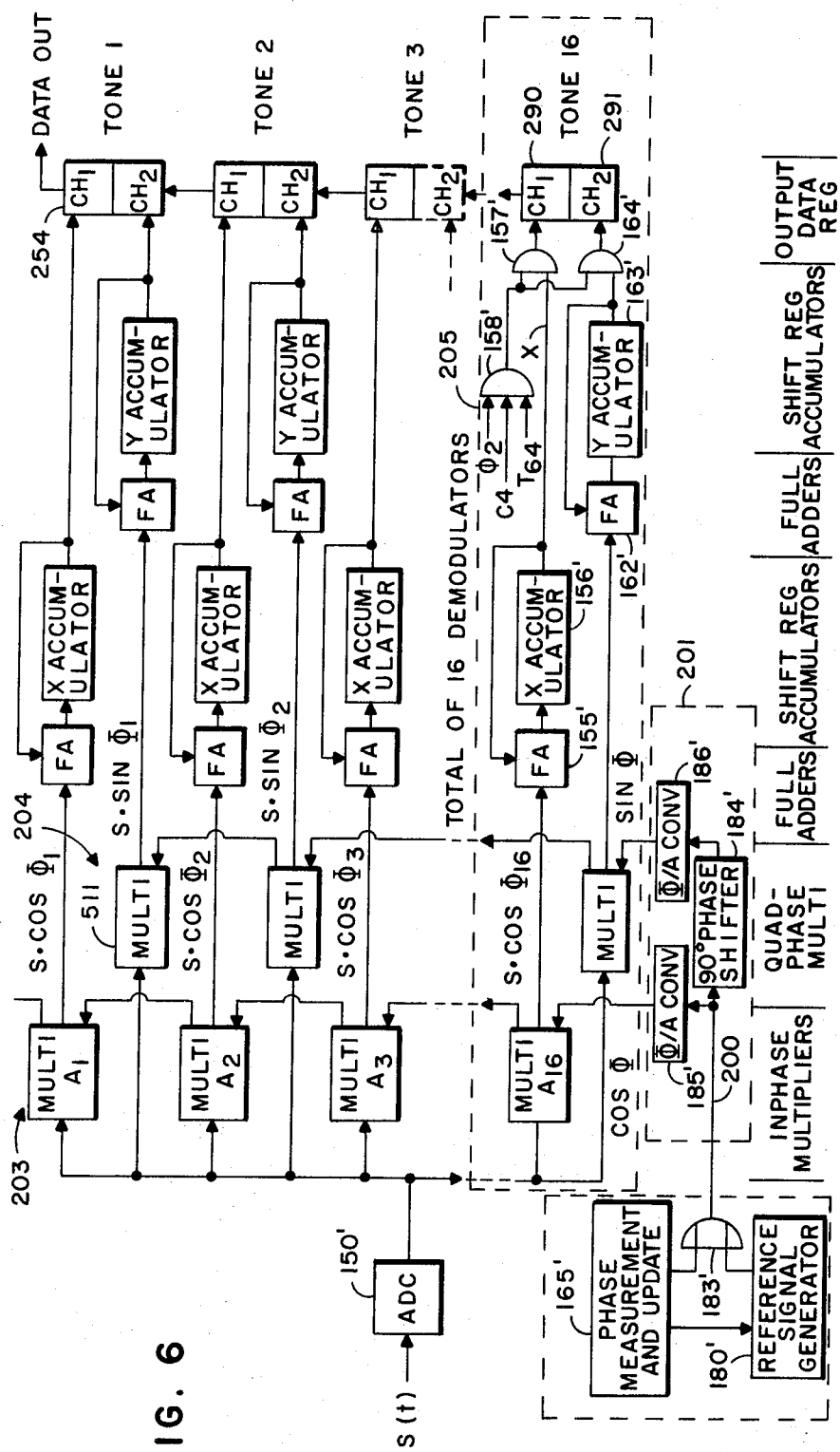
FIG. 6 is a logic diagram illustrating how the single tone demodulator can be extended to a plurality of data tones.

It is to be further noted that a separate reference signal is generated within logic 180° of FIG. 6 for each of the 16 tones of the received composite signal. Thus during each sampling interval $T_s=1/f_s$ the reference signal generating logic 180' will output seventeen phase words, each of which, except the one corresponding to the Doppler correction tone, comprises the phase reference for one of the 16 data carrying tones.

Each sampling period $T_s$, these seventeen phase words from reference signal generator 180' are supplied through the lead 200 and then changed into quadrature form by means of the phase shift logic 184', and then further changed into sine magnitude binary words by phase-to-amplitude converters 185' and 186'. The sine magnitude words are then supplied in a serial stream up through the two vertical banks of multipliers 203 and 204 which function respectively to produce the X and Y increments.

Each multiplier of banks 203 and 204 contains an input shift register with all the input shift registers in each bank being connected in series arrangement. In this manner the two streams of phase quadrature phase reference words can be supplied up through the two banks of multipliers until each input shift register contains the proper phase reference word.

As mentioned above, the reference signal generator 180' generates 17 phase words, the first of which corresponds to the Doppler tone in the received composite signal and the next 16 of which correspond to data carrying tones. In point of fact, no phase reference is required for the Doppler correction tone. However, because of the timing involved as will be seen more clearly later herein, it is necessary to generate a reference signal phase word corresponding to the incoming Doppler correction tone. This first word, however, is advanced from reference signal generator 180' input shift registers of the two banks of multipliers 203 and 204 and (in quadrature form and as sine magnitude words) beyond the last multipliers in each bank so that it is in fact lost, and only the remaining sixteen phase reference words are entered into the shift registers of the 16 multipliers of the two banks of multipliers 203 and 204.

After all of the seventeen phase words have been supplied in quadrature form up through these two banks of multipliers 203 and 204, they are each separately and simultaneously multiplied with the time coincident sine magnitude words of the incoming composite signal; i.e., the binary output from the analog-to-digital converter 150'. Such multiplication (dot product) is permitted to occur over the drive period C1 of FIG. 5, as discussed before.

Since the reference signal generator 180 and 180' of FIGS. 4 and 6 must generate 17 seven-bit phase words, said signal generator must be capable of holding a total of 7 × 17 or 119 bits. More specifically, the reference signal generator 180 of FIG. 4 comprises a 119 stage shift register which has its output connected to its input through full adder circuit 178 and 179 to provide a circulating path for the 17 phase words being generated. The entire 17 words are circulated once each sampling period $T_s$, and are incremented each circulation by the count necessary to generate the proper frequency for each of the separate 17 phase reference signals being generated.

At the end of a frame the phases of the phase reference signals are updated by suitable means, to be described later to become phase coincident with the phasor currently being received.

In the parallel arrangement of FIG. 6, the logic within the ash line block 205 represents one of the demodulators, as shown in FIG. 4.

3. PHASE MEASUREMENT LOGIC AND FUNCTION

At the termination of the drive period, which occurs at time $t_2$ in FIG. 5, the phase measurement period is initiated and continues until time $t_4$ as shown in the waveform of FIG. 5c. To terminate the drive period and to initiate the phase measurement period, the C1 pulse of FIG. 5b is terminated which closes certain AND gates of FIG. 4; i.e., causes said AND gates to be non-conductive. At this same time, $t_2$, the phase measurement pulse C2 is initiated as shown in FIG. 5c which opens certain AND gates in FIG. 4.

Specifically, at time $t_2$ AND gate 149 is closed, thus blocking the output of the analog-to-digital converter 150. The demodulator circuits AND gates 154 and 161 are also closed to disconnect the output of the multipliers 153 and 160 from the X and Y increment accumulators 156 and 163, respectively. Also closed is AND gate 182 which disconnects the reference signal from the multipliers 153 and 160.

The occurrence of phase measurement pulse C2 opens, renders conductive, AND gates 166, 167, and 196 of FIG. 4. The opening of AND gate 167 functions to connect the output of the X increment accumulator 156 through AND gate 167 and OR gate 159 to the multiplier 160. The opening of AND gate 166 functions to connect the output of Y increment accumulator 163 through said AND gate 166 and OR gate 152 to the multiplier 153. Opening of AND gate 196 functions to connect the output of the difference angle generator 195 through AND gate 196 and OR gate 183 to multiplier 153 through phase-to-amplitude converter 185 and in a parallel path to the multiplier 160 through the 90° phase shift circuit 184 and phase-to-amplitude converter 186.

Figure 7:
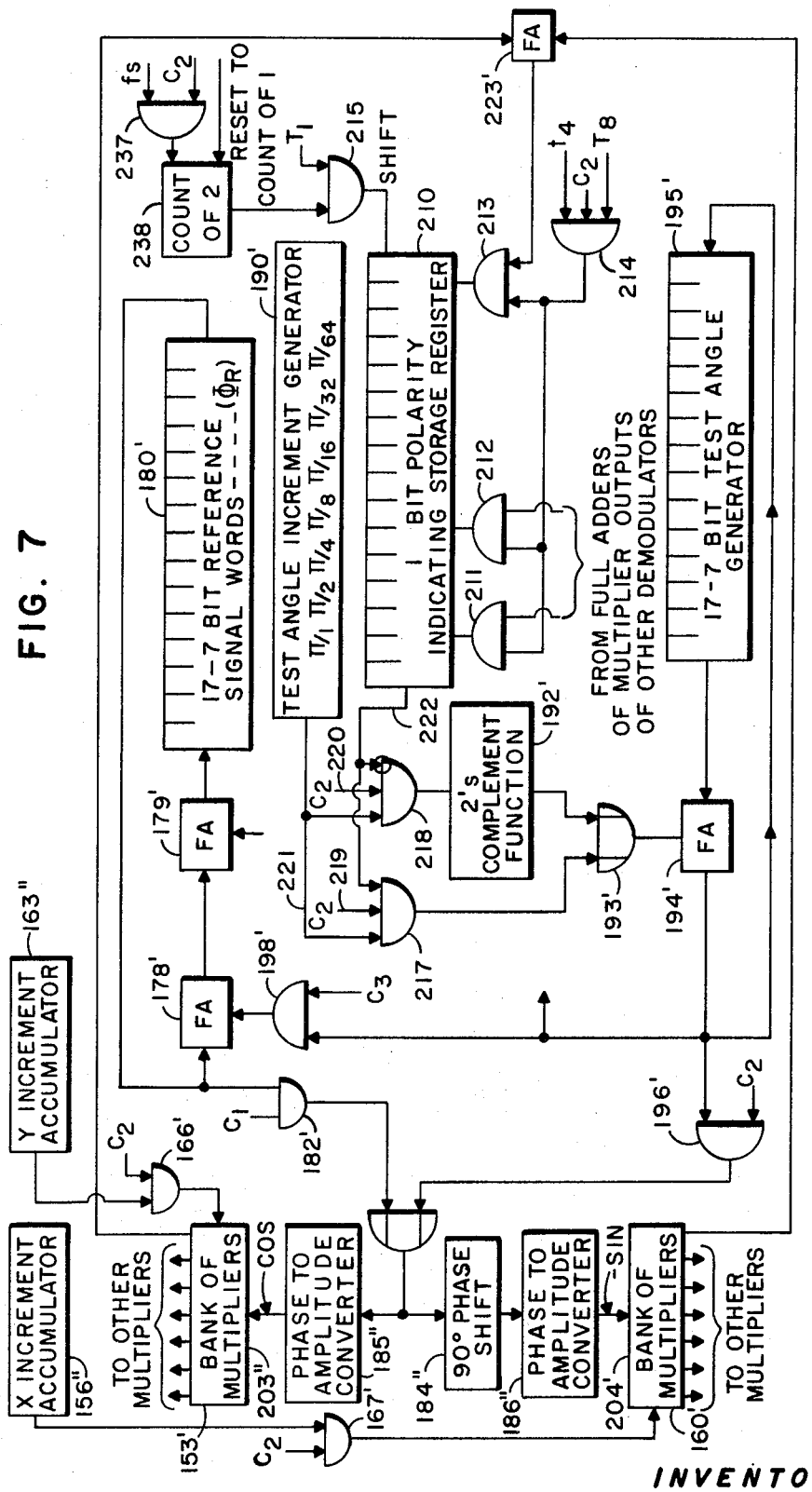
FIG. 7 is a logic diagram of the demodulator configured in the phase measurement mode.

The logic of FIG. 4 has now been rearranged in a form as shown in FIG. 7; a form in which the phase difference between the phase reference signals and the incoming phasors can be measured.

The basic philosophy of the phase measurement function is to determine the polarity of the difference between the phase angle represented by the X and Y accumulator contents and the phase angle represented by the difference angle being generated. Such difference is then narrowed by successively adding or subtracting increasingly smaller increments to the difference angle being generated. By such a procedure the difference angle can be caused to become substantially coincident with the phase angle represented by the contents of the X and Y accumulators over a series of N such operations. In the particular embodiment of the invention shown, a value of N equal to six such cycles of adding or subtracting increasingly smaller test angle increments is employed.

The polarity of the difference between the stored X and Y increments and the difference angle can be determined by performing the operations set forth in (6) below, which is derived from expression (1). Expression (1) is simply a statement of the polarity of the difference between the phase angle represented by the stored X and Y increments and the difference angle being generated. This difference in angles is defined as the error to be corrected.

$$\text{Error} = (\phi_{in} - \alpha) \quad (1)$$

Where $\phi_{in}$ is the phase angle represented by the stored X and Y increments, and $\alpha$ is the difference angle being generated;

Then, $$\text{Polarity Error} = [E_{in}\sin(\phi_{in}-\alpha)] \quad (2)$$

$$= [E_{in}\sin\phi_{in}\cos\alpha - E_{in}\cos\phi_{in}\sin\alpha] \quad (3)$$

Where $E_{in}$ is the amplitude of the input tone signal so that;

$$E_{in}\sin\phi A H in = Y \quad (4)$$

and $$E_{in}\cos\phi A Yin = X \quad (5)$$

Therefore, $$\text{Polarity Error} = \text{polarity} [Y \cos\alpha - X \sin\alpha] \quad (6)$$

which is the expression implemented by the structure of FIG. 7.

In expression (6), $\cos\alpha$ and $\sin\alpha$ are respectively the outputs of the phase-to-amplitude converters 185" and 186" of FIG. 7. The quantities X and Y are defined in expressions (4) and (5).

The general concept of the logic employed in the phase measurement function is as follows. In FIG. 7 a test angle generator 190' is caused to contain, at the beginning of phase measurement, a test angle of $\pi$ phase or 180° which, in terms of the seven bit phase representing binary words, is equal to 64 or the binary number 1 000 000.

As will be recalled, each of the 16 pairs of X and Y increment accumulators 156" and 163" contain X and Y binary values which represent a given phase relation between the last received phasor and the phase of the reference signal during the last dot product multiplication between the said two signals, for a given one of the 16 data tones. Only one data tone will be considered in this discussion, however.

The output of the difference angle generator 195', which represents a phase angle having a given phase relation with the X and Y components stored in accumulators 156" and 163", is supplied through the multipliers 153' and 160' as cosine and a minus sine functions, respectively, as shown in FIG. 7.

The difference in phase angle between the output words of the difference angle generator 195' and the X and Y components stored in the accumulators 156" and 163" can be expressed as positive or negative binary quantities whose magnitude represents the amount of phase difference and whose polarity represents the leading or lagging relation of the two vectors. The polarity is the important factor and is determined by carrying out the operations called for in expression (6). More specifically, the output of the Y increment accumulator 163" is multiplied by the cosine function of the difference angle (cosine A). From this quantity is substrated the product of output of the X increment accumulator 156" multiplied by the sine function of the difference angle ($-$sine A).

During the phase measurement period such multiplication and subtraction process occurs once each sampling period $T_s$. A means such as adder 223' in FIG. 7 is provided to detect the polarity of the operation of expressions (1) or (6). Such polarity is then stored in a register 210 and during the next immediate sampling period is employed to determine whether the difference angle should be increased or decreased to cause it to move towards the phase angle represented by the accumulated X and Y increments. As discussed below, the difference angle is increased or decreased by the test angle generated by and supplied from test angle generator 190'.

Logic means are provided so that after each operation said difference angle is either increased or decreased by one half the angle that it was increased or decreased on the previous operation. Thus, since the test angle generator 190' was originally set to contain a binary word equal to $\pi$ the angle $\pi/2$ would be either added or subtracted to the difference angle after the first comparison between said difference angle and the X and Y stored increments, depending upon the direction the difference angle vector must be rotated to approach the vector represented by the X and Y increments.

After the completion of the second operation defined in expression (1), an angle $\pi/4$ will be either added or subtracted to the difference angle in the manner set forth above.

The test angle generator 190' is constructed to consecutively provide decreasing angle increments to the difference angle generator 195', with each successive sampling period during the phase measurement interval C2. Whether the test angle should be added or subtracted to the difference angle being generated is implemented logically by AND gates 217 and 218 and the 2's complement function 192', which respond to the polarity of the output of storage register 210 to cause the binary output of test angle generator 190' to be added directly to the difference angle in full adder 194' or, conversely, to pass through the 2's complement function 192' and then add said 2's complement result to the difference angle in full adder 194', and thus in effect subtracting the test angle increment from said difference angle. The decision is accomplished via the "not" (inverted) input for AND gate 218 with respect to the signal received from register 210.

Thus, in a manner similar to the taking of the dot product between the phase reference signal, in binary form, and the supplied sine magnitude signal of the received composite signal, in binary form, the accumulated X and Y increments and the quadrature forms of the generated difference angle are circulated through the system at the sampling rate $f_s$, with the operation called for in expression (1) being performed thereon once each circulation.

Up to this point the discussion has related largely to a single tone. Actually the logic of FIG. 7 is designed to handle 16 data tones plus 1 Doppler tone. For multi-tone reception the difference angle generator 195' functions to generate a stream of 17 seven bit words, one for each of the 16 data tones and one for the Doppler tone. The 16 seven bit difference angle words representing data tones are supplied from the two phase-to-amplitude converters 185' and 186' to the banks of multipliers 203 and 204 of FIG. 6 in the same way as the sequence of 17 reference signal words are supplied to said banks of multipliers during the data drive interval. FIG. 7 also shows in slightly more detail the logic within the block 191 of FIG. 4.

More specifically, in FIG. 7 there is shown the 16 bit storage register 210 which accepts the 21st or last bit of the output of full adder 223', which last bit represents the polarity of the difference of the dot product from the two multipliers 153' and 160' after each operation of the phase measurement function, as set forth in expression (1). Since there are 16 data tones being demodulated, shift register 210 requires a capacity of 16 bits with the polarity sign bit from the full adder of each demodulator being entered through one of the AND gates such as AND gate 211, 212, and 213 into its assigned stage in shift register 210. Shift register 210 also contains one bit for the Doppler tone, although it is not used for phase measurement; only to simplify the timing.

Figure 8:
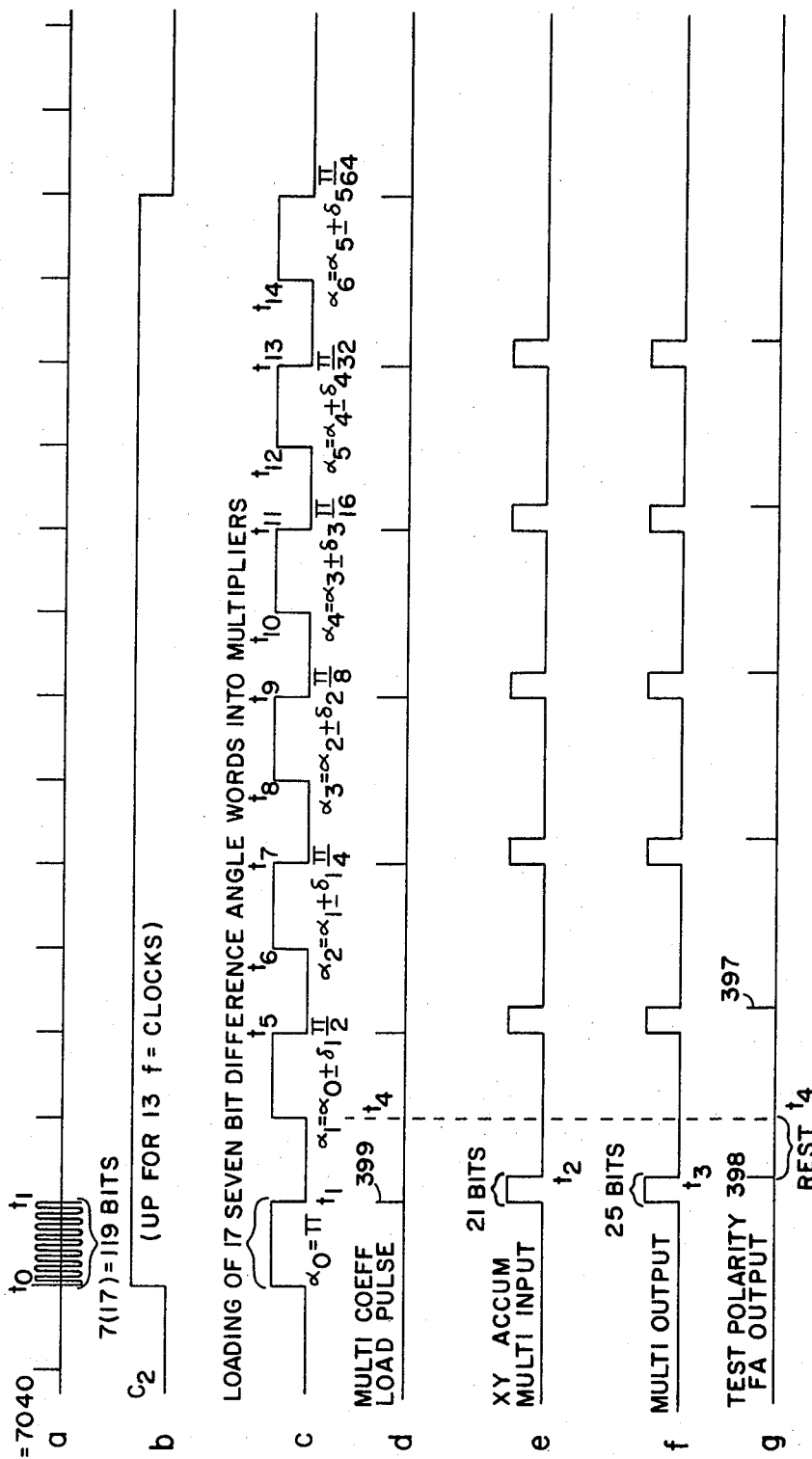
FIG. 8 is the timing required for phase measurement.

As can be seen from the waveform of FIG. 8c and 8d the difference angles are loaded into the multipliers every other sampling period $T_s$, and then during the alternate interleaved sampling periods the multiplication process and the determination as to whether the next test angle increment should be added or subtracted to the difference angle is determined, as shown in FIGS. 8e, 8f, and 8g. Thus in FIG. 8, for example, during time interval $t_0-t_1$, the quadrature forms of the difference angle for all 16 data tones are loaded in serial manner into the two banks of 16 multipliers each and then, during time period $t_1-t_4$ the multiplication and the testing of the outputs of the full adders such as full adder 223', are made to determine whether the next test angle increment should be added to or subtracted from the difference angle being formed.

The logic by which such alternate functions of loading the multipliers and then performing the multiplier and polarity test functions includes AND gates 237 and 215 and the counter 238 of FIG. 7, which operate together as follows.

Upon the occurrence of the control pulse $C_2$ the AND gate 237 is conditioned to pass the sampling pulses $f_s$ into counter 238 which begins its count from a reset to zero condition. The first $f_s$ pulse functions to establish a count of one in counter 238, which opens AND gate 215 and thereby allows the $T_1$ pulses (which define the time slot of the first bit of each word. See FIG. 7) to pass therethrough and into shift register 210 to shift the bits therefrom at a rate of one bit for each seven bit word being transferred simultaneously out of the difference angle generator 195'. As each of the sixteen bits are shifted out of register 210 they are supplied to the AND gates 217 and 218 which also receive the output of the test angle generator 190'.

The said AND gates 217 and 218 operate as a switch so that if one is conductive the other is non-conductive; the conductivity of said AND gates being determined by the polarity of the output from each of the 16 bits stored in register 210. More specifically, if the polarity of a given bit from shift register 210 is a binary one, which has a plus value, then AND gate 217 is conductive and AND gate 218 is non-conductive so that the output from test angle generator 190' will pass directly through AND gate 217 and OR gate 193' and then into full adder 194' where it will be added to the corresponding seven bit difference angle word being circulated through register 195'.

On the other hand, if the output of the storage register 210 is zero, representing a minus polarity, then AND gate 218 is conductive and AND gate 217 is non-conductive. Under these conditions, the output from test angle generator 190' will pass through AND gate 218 and then through the 2's complement function 192', OR gate 193', and then into full adder 194', where it will be added to the corresponding seven bit word from difference angle storing shift register 195'.

However, since said test angle increment from test angle generator 190' has passed through the 2's complement function 192' the addition of the output of the 2's complement function is in effect a subtraction of the original test angle increment from the corresponding word being supplied from difference angle register 195'.

Thus it can be seen that the 16 data tone bits stored in the polarity indicating register 210 function to control a switch comprised of AND gates 217 and 218, which directs the test angle increment either through the 2's complement function 192', or around said 2's complement function, in accordance with the polarity of the bit in the register 210. It is to be noted, by definition, that the timing of the circulation of the 17 seven bit difference angle words around shift register 195' is synchronized with the output of the 17 bits of polarity indicating shift register 210. More specifically, each of said 17 polarity indicating bits from register 210 occurs at the beginning of the first bit of the corresponding seven bit word from storage register 195' since the contents of storage register 210 are shifted by the $T_1$ pulse supplied to the AND gate 215. By definition, the $T_1$ pulse defines the time slot of the first bit of each of the seven bit words being generated in register 195', and therefore, is time coincident therewith.

It is to be noted that AND gates 217 and 218 are conditioned to be conductive only during the presence of the phase measurement control pulse $C_2$.

4. PHASE UPDATE LOGIC AND FUNCTION

Just before termination of the phase measurement pulse, which occurs at time $t_4$ in the waveform of FIG. 5c, the phase update control pulse $C_3$ occurs (at $t_3$). Such phase update control pulse is shown in the waveform of FIG. 5d and occupies a 136-microsecond time interval $t_3-t_4$. Such 136-microsecond time interval is equal to slightly less than the period $T_s$ of the sampling rate $f_s$.

The phase update function generally involves the adding of the difference angle generated by the difference angle generator 195 of FIG. 4 to the reference signal of logic block 180 through AND gate 198.

During the update function the AND gates controlled by control pulse $C_2$ are open (conductive).

However, the AND gates controlled by the drive interval pulse C1 are closed during the phase update function. Consequently, AND gates 149, 154, and 161 are all non-conductive.

Figure 9:
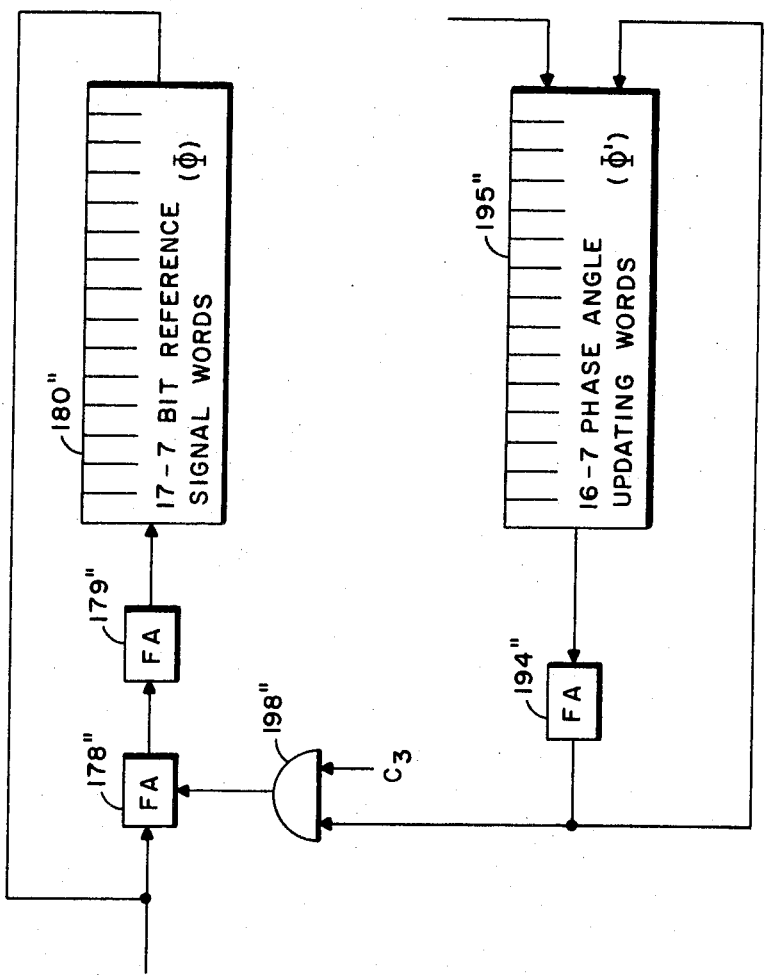
FIG. 9 is a logic diagram of the demodulator in the phase update mode.

The resultant operable logic during the phase update function is shown in FIG. 9.

Near the termination of the phase measurement function, the phase update pulse C3 begins, as shown in the waveform of FIG. 5. The updating function occurs during one circulation of the 17 seven bit reference signal words out of the shift register 180' of FIG. 7 and through full adders 178' and 179', which requires almost one full sampling period of 136 microseconds, as shown in the waveform of FIG. 5d.

With the occurrence of phase update pulse C3, AND gate 198'' becomes opened so that the portion of FIG. 7 shown in FIG. 9 is operable.

It can be seen from FIG. 9 that each of the 17 seven bit words stored in shift register 195'' is combined in full adder 178''. Here again the two sets of 17 seven bit words are circulated synchronously around their respective loops and are supplied synchronously to full adder 178'' so that corresponding bits of the two words from shift registers 180'' and 195'' are combined in full adder 178'', with the following exception.

It is to be noted as discussed hereinbefore, that the first phase reference word corresponds to the Doppler correction tone so that no phase updating thereof is needed. Consequently, said first phase reference word and the first difference angle word from register 195'' are not combined in full adder 178'' by virtue of the phase update pulse C3 not opening AND gate 198'' until immediately after the circulation of said first words. Reference is made to the waveform of FIG. 10c which shows the phase update pulse C3 beginning at time $t_1$, immediately after circulation of said first words from registers 180'' and 195'' of FIG. 9.

FIG. 10 also shows in waveform a the bit circulating timing pulses having a rate of 7 × 17 × 7,040 or 837.76 kHz, and in waveforms b and d shows the synchronous relation between the phase reference words and the difference angle word circulating from registers 180'' and 195'' respectively of FIG. 9.

5. DATA DETECTOR LOGIC AND FUNCTION

At the completion of the phase update interval the data detect interval begins, as shown in waveform e of FIG. 5, and occupies a time interval Ts = 142 microseconds which is a sample clock period.

Essentially, the data detect function involves only the determination of the polarity of the binary totals accumulated in the X and Y accumulators 156 and 163 of FIG. 4 for example. As will be discussed later in more detail, the accumulators 156 and 163 have a capacity of twenty-one bits and the polarity of the contents of such accumulators is determined by the most significant bit, which is the 21st bit. Consequently, only the twenty-first bit needs to be sampled and examined in the totals accumulated in said X and Y accumulators.

Figure 11:
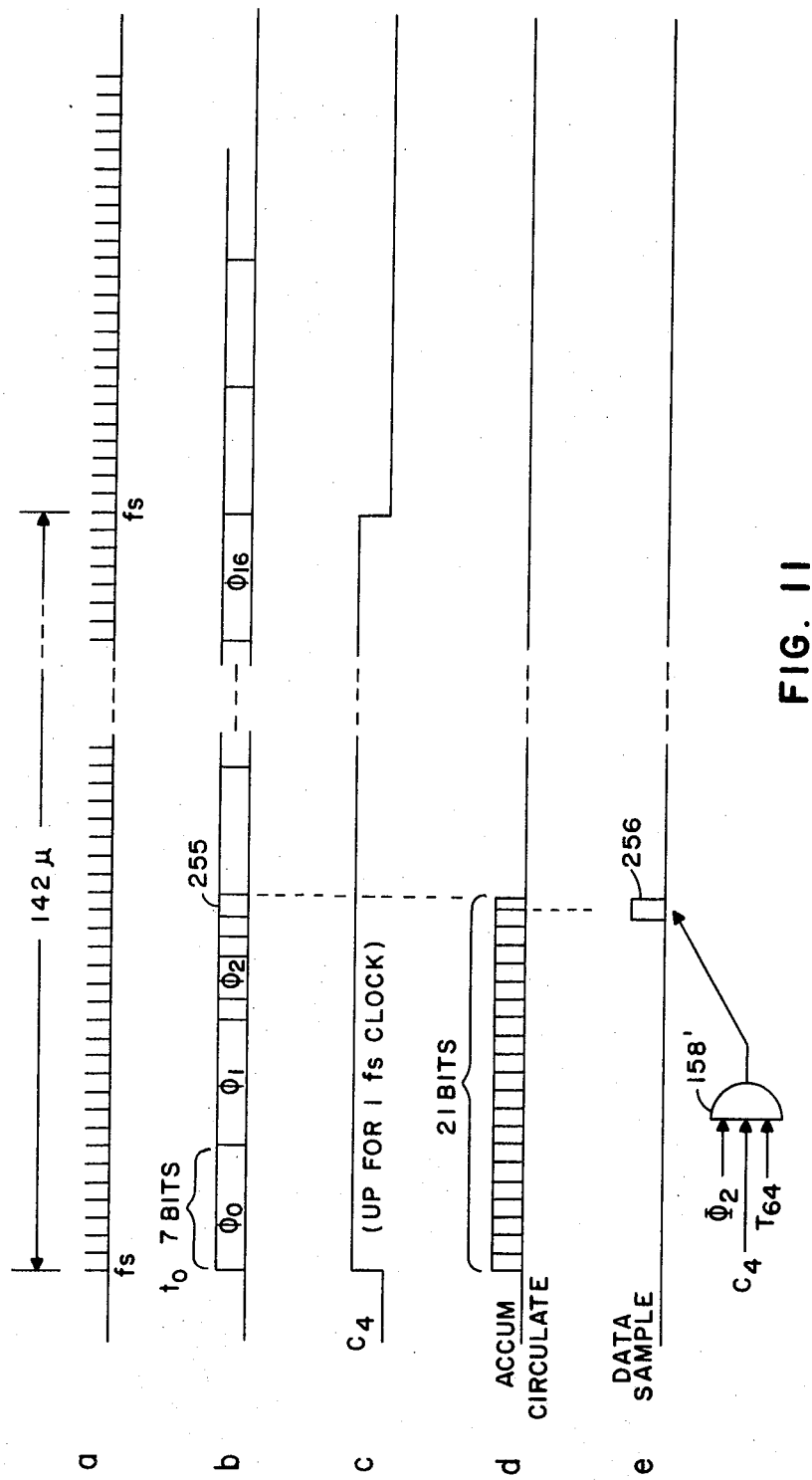
FIG. 11 illustrates the timing for the data sample mode.

As can be seen from the timing waveforms of FIG. 11, the above-mentioned 21st bit is the last bit of the third, seven bit phase reference signal, which bit is identified by reference character 255 in waveform b. AND with inputs $\phi_2$, $C_4$, and $T_{64}$ AND gate 158' in FIG. 6 will produce an output during the last bit time slot of the third phase reference word $\phi_2$, which is coincident with the 21st bit of the contents of the X and y accumulators as such contents are circulated therefrom.

The output of AND gate 158 is supplied to a bank of AND gates such as and gates 157 and 164 of FIG. 4, which function to gate the 21st bit of the X and Y accumulators 156 and 163 to appropriate flip-flop circuits. Such flip-flop circuits are shown in FIG. 6 and specifically are identified by the reference character 254. While each flip-flop of bank 254 has the arrangement of AND gate logic preceding it as shown in FIG. 4, only the demodulator 205 of FIG. 6 is shown with such logic.

Each demodulator has two flip-flops associated therewith. For example, the demodulator 205 in FIG. 6 has flip-flops 290 and 291 connected to the X and Y outputs of said demodulator 205. Depending upon the polarity of the X and Y outputs of accumulators 156' and 163' the two flip-flops 290 and 291 will be set or reset.

It will be observed that the bank of flip-flops 254 are connected in series arrangement so as to form one long vertical shift register. Thus after the X and Y data from each of the 16 demodulators are supplied simultaneously, and in parallel, into each associated pair of flip-flops of the bank of flip-flops, then all of said data can be shifted vertically therefrom in a serial manner and through a suitable utilization means not shown.

It is to be understood, however, that the data shifted out of the shift register 254 is, at this time, in two level form and is time synchronous in nature.

A. DRIVING LOGIC AND TIMING

Figure 12:
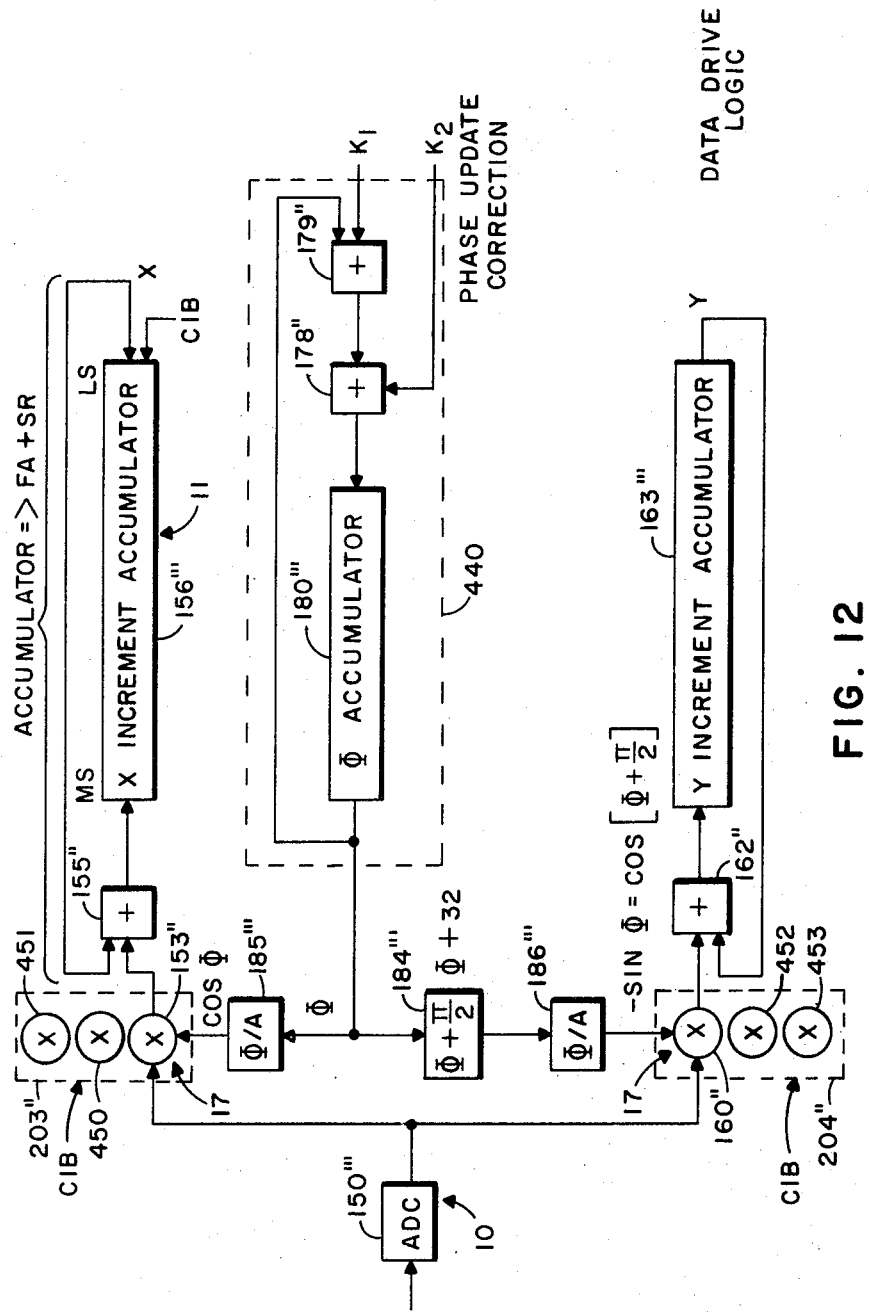
FIG. 12 is a logic diagram of the demodulator configured in the data drive mode.
Figure 13:
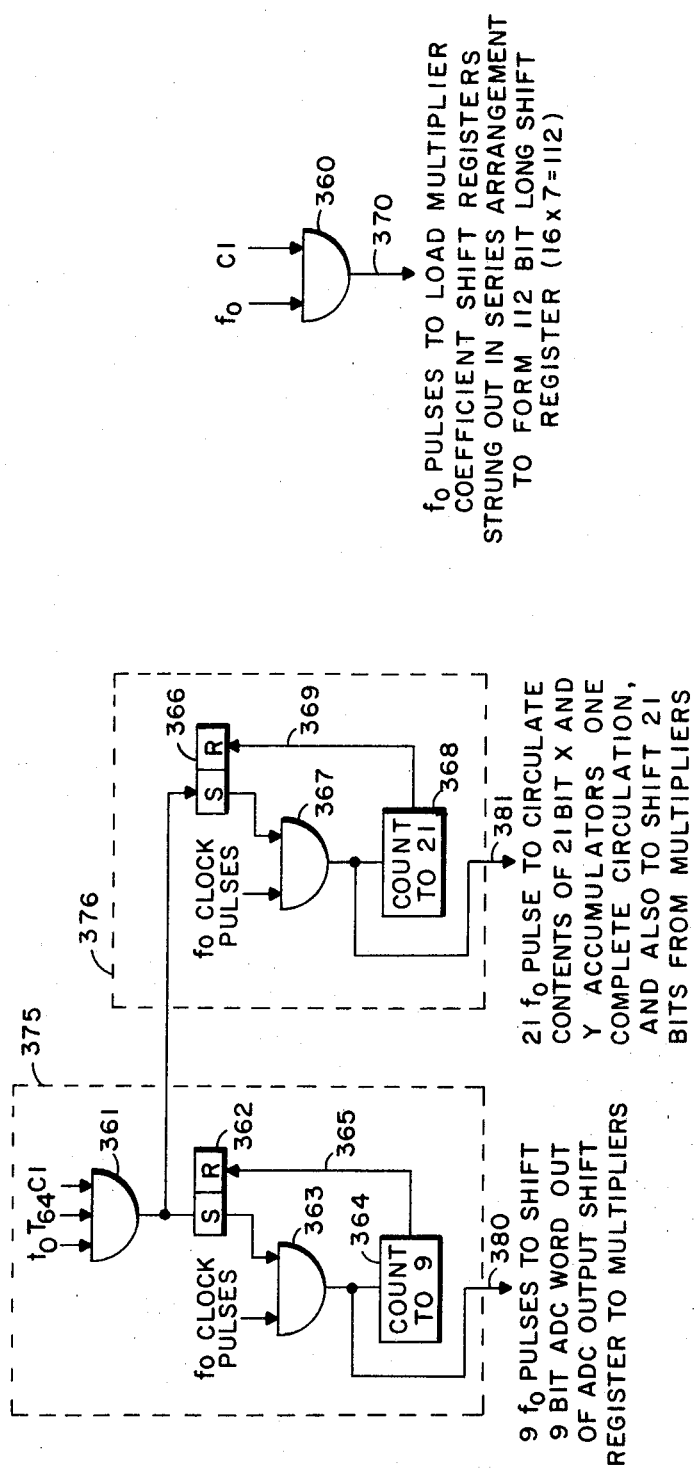
FIG. 13 shows the time base logic required for the data drive mode.

In the detailed discussion of the data drive function FIGS. 6, 8, 12, 20, and 13 must all be considered together. More specifically, FIG. 12 shows the logic of the demodulator when it is in the data drive mode of operation; FIG. 6 shows the logic for arranging in parallel form the 16 demodulators required to demodulate the 16 data carrying tones of the received composite signal. The 17$^{th}$ tone which is the Doppler correction tone is not demodulated in the same manner as the 16 data carrying tones; FIG. 20 shows the time relation of the data in various parts of FIGS. 12 and 6; FIG. 13 shows the logic for controlling the logic of FIGS. 12 and 6 so that the data will flow in the proper time relationship as shown by the waveforms of FIG. 20.

As discussed hereinbefore, each of the 16 demodulators has a phase reference signal generated therefor which has a frequency equal to the tone to be extracted from the received composite signal. All 16 of the phase reference signals are generated in a common reference signal generator (accumulator) 180''' of FIG. 12 as seven bit words. The said 17 seven bit phase words, shown in waveform b of FIG. 20, are then transformed into quadrature forms of sine magnitude words, as shown in waveform c of FIG. 20 by the phase-to-amplitude converters 185''' and 186''' and then supplied respectively to the banks of multipliers 203' and 204' of FIG. 12.

These banks of multipliers 203' and 204' each contain 16 multipliers, one for each of the 16 data demodulators. The bank of 16 multipliers 203' functions to produce the X increment of the incoming tone and the bank of multipliers 204' functions to produce the Y component, as can be seen in FIG. 12. The banks of multipliers 203' and 204' are shown in more detail in FIG. 6 and can be seen to be supplied by a common circuit 201.

Each multipliers of the two banks of multipliers 203' and 204' contains an input shift register known herein as a coefficient load shift register. This shift register is seven bits long and is connected in series with the shift register of each of the other multipliers in the same bank. Thus the bank of multipliers 203' contains 16 seven-bit coefficient load shift registers as does the bank of multipliers 204'.

The stream of sine magnitude words is supplied in series up through the 7 × 16 stage shift registers in each bank of registers. After 119 shift pulses, designated $f_o$ and shown in FIG. 20a, the proper sine magnitude word will be stored in the shift register of each multiplier in the two banks 203' and 204'. It is to be noted that the sine magnitude words, as shown in waveform c of FIG. 20 are only six bits in length and are delayed from their originating phase word by one word length. Since the sine magnitude words of waveform c are only six bits in length they must be spaced apart one bit length, as shown in waveform c, in order to maintain the proper word synchronization as they are shifted into the coefficient load registers of the banks of multipliers in FIG. 20. Such spacing requirement also necessitates that each of the coefficient load registers of the multipliers be seven bits in length. Thus when each of the sine magnitude reference words is stored in their proper coefficient load register, one stage of each of the seven stage load coefficient shift registers will contain no data but will merely provide the proper spacing between the sine magnitude words.

The one word delay between the sine magnitude words of waveform c of FIG. 20 and the phase words of waveform b, from which they are derived, is due to the operation of the phase-to-amplitude converters 185''' and 186''' of FIG. 12 which introduce such delay in the course of their function. Reference is made to the aforementioned co-pending application, Ser. No. 833,460 for a detailed discussion of a phase-to-amplitude converter suitable for use in the present invention.

Some marker is required to indicate when the last sine magnitude word, such as word 334 in waveform c of FIG. 20 has been loaded into the bank of multipliers 203' and 204'. Such a pulse is shown in waveform d as pulse 335 and is generated by the logic shown within the dotted block 375 of FIG. 13.

More specifically, the inputs to AND gate 361 are $t_0$, $T_{64}$, and C1. The inputs $T_{64}$ and $t_0$ identify the time slot of the last bit of the first word of $t_0$, and will produce an output from AND gate 361 at such time. Such output is the load coefficient pulse 335 of waveform d of FIG. 20 which functions to initiate three operations as follows:

1. To supply the nine bit sine magnitude word from the analog-to-digital converter 150' of FIG. 6 to all of the multipliers of both banks of multipliers 203 and 204.
2. To perform the summation of the partial products operation performed by each of the multipliers, as will be explained in more detail later. The output of the multiplier is shown in waveform f of FIG. 20.
3. To circulate the 21 bits of data stored in each of the X and Y increment accumulators such as X and Y accumulators 156''' and 163''' of FIG. 12. The circulation is through the associated full adders 155'' and 162'' wherein the output of the multipliers 153'' and 160'' is added to the contents of the X and Y accumulators to produce a new total, which is immediately shifted back into the X and Y accumulators.

Some means are required to synchronize the output of the multipliers with the circulation of the data from and to the X and Y accumulators and to terminate the train of shifting pulses at the end of one complete circulation of the data around the X and Y accumulators.

The logic for accomplishing such function is shown in FIG. 13. More specifically, the output of AND gate 361, which is the pulse of FIG. 20d, functions to create trains of pulses on output terminals 380 and 381 which respectively supply the nine bit word from analog-to-digital converter 150''' to multiplier banks 203'' and 204'' of FIG. 12, and to shift the 21 bits stored in the X and Y accumulators therearound.

The first of nine $f_o$ pulses formed on output lead 380 of FIG. 13 is generated as follows. The output pulse from AND gate 361 sets flip-flop 362 which conditions AND gate 363 to pass $f_o$ pulses. A counter 364 counts nine such $f_o$ pulses and then functions to reset flip-flop 362, thus turning off AND gate 363. Thus nine $f_o$ pulses are generated on output lead 380, measured from the reference pulse 335 of waveform d of FIG. 20.

The first of 21 $f_o$ pulses occurring on output 381 of FIG. 13 is generated as follows. The output pulse from AND gate 361 sets flip-flop 366 to condition AND gate 367 to pass $f_o$ pulses therethrough. A counter 368 responds to 21 of such $f_o$ pulses to reset flip-flop 366 and thereby turn off AND gate 367. In this manner 21 $f_o$ pulses have been supplied to the output lead 381. These 21 pulses are supplied to each of the 16 X increment accumulators and to each of the 16 Y increment accumulators to circulate the data stored therein once therearound and through the associated full adder.

It is to be noted that a coefficient load pulse such as pulse 335 of FIG. 20d occurs in the time slot of the last bit of the $16^{th}$ sine magnitude word in each sampling period during the data drive time. Thus pulse 383 of FIG. 20d occurs during the last time slot of the last bit of the $16^{th}$ sine magnitude word 384.

The stream of phase reference sine magnitude words to the two banks of multipliers is continuous during the data drive time and is controlled by means of AND gate 360 having inputs of C1 and $f_o$. At the termination of the drive time, AND gate 360 is turned off and the supply of $f_o$ pulses to the multiplier load coefficient shift registers is terminated. It should be specifically noted that while the supply of reference signal sine magnitude words to the multiplier load coefficient shift registers is continuous during the data drive period, the supply of timing pulses to other portions of the multiplier which perform the summation of the partial product operation is not continuous, and occurs periodically during each $f_s$ sampling period, as shown in waveform f of FIG. 8, which has been discussed hereinbefore.

As discussed above, while 17 phase words are generated in the phase reference signal tone generator 440 of FIG. 12 only 16 multipliers in each bank of multipliers are provided. The first of the seventeen phase reference words is employed to demodulate the Doppler correction tone which requires no phase shift and consequently is shifted up through and out the end of the load coefficient shift registers. Wording the foregoing in another way, the total storage capacity of the bank of 16 seven bit load coefficient multipliers is 112 bits whereas the number of shift pulses employed in shifting the data into the bank of multipliers is 119 pulses. Thus the first sine magnitude word shifted into the load coefficient shift registers, bank of multipliers is shifted up through said shift registers and out the end of the last such shift register and is lost. Only the 16 sine magnitude words, corresponding to data carrying tones, remain stored in the load coefficient registers of the multipliers.

B. PHASE MEASUREMENT LOGIC AND TIMING

1. GENERATION OF TIMING AND DRIVING SIGNALS

As discussed in Section II – B – 3, above, the 17 phase reference words contained in shift register 180' of FIG. 7 are updated once each frame period so that the said phase reference words will have the phase of the currently received phasor in order to function as the phase reference for the next received phasor.

The aforementioned result is obtained generally by circulating the 17 seven-bit difference angle words from shift register 195' through the two phase-to-amplitude converters 185'' and 186'' and then into the two banks of multipliers 203' and 204' where they are multiplied by the contents of the X and Y increment accumulators for each of the 16 data tone demodulators. The outputs of each pair of multipliers, such as the multipliers 153' and 160', are then supplied to a full adder 223'. Next, the polarity of said difference is supplied through AND gate 213 into a 17-bit polarity indicating storage register 210 which has a storage capability of 17 bits, one for each of the 16 data tones and one for the Doppler tone.

During the next circulation of the 17 difference angle words through the multipliers, each difference angle is either incremented or decremented by progressively decreasing phase increments until each of the 17 difference angles represents the same phase vector as is represented by the contents of the X and Y increment accumulators during that frame time. The Doppler tone phase difference angle is again not used in this function of the demodulator.

The logic for updating the difference angles includes AND gates 217 and 218 and the 2's complement functions 192' which function to respond to each polarity bit from register 210 as it is shifted therefrom in synchronism with the difference angle word rate, to determine whether the test angle increment should be added or subtracted. If subtracted, it is passed through the 2's complement function 192' and then into full adder 194' where addition with the difference angle occurs.

It is apparent that several timing signals are required in the operation of the phase measurement function. These timing signals are as follows:

1. 119 $f_o$ pulses to circulate the 17 seven bit difference angles from register 195', through the phase-to-amplitude converters and into the banks of multipliers 203'' and 204''. This pulse train appears at the output of AND gate 482 of FIG. 22.
2. A pulse train having an occurrence rate equal to the difference angle word rate, and functioning to shift the 17 polarity indicating bits from the polarity indicating storage register 210 of FIG. 7. This signal appears at the output of AND gate 485 of FIG. 22.
3. The multiplier coefficient load pulse train for loading the difference angles from the multiplier input load shift register into the multiplier for the multiplication operation. This waveform appears at the output of AND gate 488 of FIG. 22.
4. A 21-bit pulse train at the $f_o$ rate for supplying the contents of the X and Y accumulators into the multipliers where a dot product multiplication with the difference angle words occurs. This train of pulse appears at the output of AND gate 489 in FIG. 22.
5. A train of 25 pulses at the $f_o$ rate for shifting the dot product of the difference angle words and the accumulator words from the multipliers. This train of 25 pulses appears at the output of AND gate 492 of FIG. 22.
6. A marking pulse for identifying the $25^{th}$ bit of the difference between the outputs of the two multipliers of each demodulator. This $25^{th}$ bit defines the polarity of said difference and indicates whether the next test angle increment should be added or subtracted to the difference angle. The aforementioned train of pulses appears at the output of AND gate 213' of FIG. 22.

Figure 22:
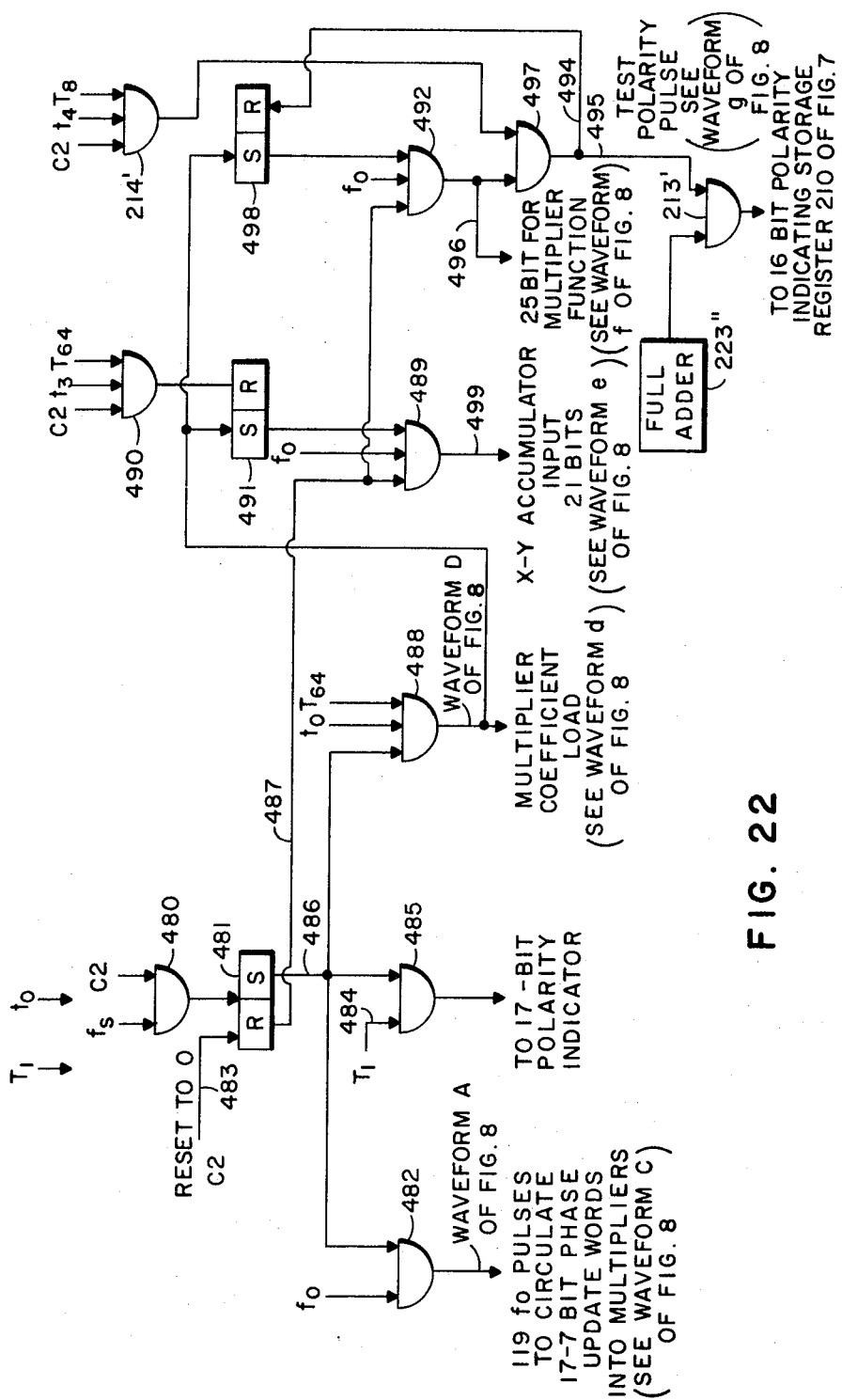
FIG. 22 is a logic diagram for generating various timing signals required for the phase measurement mode.

Consider first the logic of FIG. 22 for generating the 119 $f_o$ timing pulses every other sampling period as is required and shown in waveform c of FIG. 8.

The two inputs to AND gate 480 are the phase measurement control pulse C2 and the train of sampling pulses $f_s$ so that an output is generated from AND gate 480 every sampling pulse during the phase measurement function C2.

Such output pulses are supplied to a single input flip-flop circuit 481 which has a reset condition and a set condition. The first $f_s$ pulse supplied to the flip-flop 481 will cause it to assume its set condition from its normally reset condition. The output of flip-flop circuit 481 is then supplied to AND gate 482 to condition said AND gate 482 to pass the $f_o$ pulses which are being supplied to the other input lead thereof.

At the occurrence of the next $f_s$ pulse the flip-flop 481 will be caused to become reset, thus turning off AND gate 482 and also terminating the flow of $f_o$ pulses therethrough. Between the two $f_s$ pulses, 119 $f_o$ pulses will pass through AND gate 482, as indicated in waveform a of FIG. 8 during time interval $t_o$–$t_1$. Such 119 $f_o$ shift pulses function to step the 119 bits stored in difference angle generating means 195' of FIG. 7 therefrom and out to the two phase-to-amplitude converters 185'' and 186'' wherein, with the aid of 90° phase shift means 184'' quadrature phased forms of the difference angle words are generated in sine magnitude form.

From the phase-to-amplitude converters 185'' and 186'' the sine magnitude difference angle words are supplied to banks of multipliers 203' and 204' in the same manner that the stream of 17 phase reference signal words were supplied thereto as discussed previously.

It is to be noted that difference angle generating means 195' has the capacity to hold 17 seven-bit words. However, as in the logic for supplying the phase reference signal words to the multipliers during the drive function, only 16 difference angle words are actually entered into the 16 multipliers of each banks of multipliers, the first word being caused to be shifted through and out of the bank of multipliers since it corresponds to the Doppler correction tone.

Again in a manner quite similar to the multiplication operation during the data drive section there is generated a multiplier coefficient load pulse 399 as shown in waveform d of FIG. 8 as soon as the stream of 16 test angle words for the data tones have been shifted into their appropriate multipliers. Also, in a manner similar to that of the data drive multiplication operation, the generation of the pulse 399 in waveform d initiates two operations as follows:

1. The shifting of the 21 bits of data stored in the X and Y accumulators into the bank of multipliers other than the one with which they were associated during the data drive function. Thus, for example, in FIG. 7 the contents of the X accumulator 156'' are circulated to the quad-phase bank of multipliers 204'; and the output of the Y accumulator 163'' is circulated to the in-phase bank of multipliers 203', where they are multiplied by the inphase and quad-phase forms of the difference angle words, respectively.

2. The multiplication process which involves the shifting of 25 $f_o$ pulses to the multiplier to enable the partial product multiplication process between the contents of the X and Y accumulators and the associated difference angle words to occur. The output of the multipliers then appears as a stream of 25 bits, as shown in waveform f of FIG. 8. The logic for implementing the data flow shown in waveforms d, e, and f of FIG. 8 will now be described.

More specifically, referring to FIG. 22, the multiplier coefficient load pulse 399 of waveform d is generated at the output of AND gate 488 which has as its input the set output of flip-flop 481 and the word and bit time slots $t_o$ and $T_{64}$, which define the last bit of the first difference angle word $\alpha_o$ shown in waveform c of FIG. 8.

To generate the trains of 21 pulses for driving the X and Y accumulators, the coefficient load pulse is supplied to the set input of flip-flop 491. AND gate 489 responds to the set condition of said flip-flop 491 and also to the reset condition of flip-flop 481 to pass a series of $f_o$ pulses to its output lead 499. After 21 of such $f_o$ shift pulses have been passed through AND gate 489 the flip-flop 491 is reset by the output of AND gate 490, which has as its inputs C2, $t_3$, and $T_{64}$. These inputs define the seventh bit time slot of the fourth phase word position measured from $t_o$. An examination of the waveforms of FIG. 8 will show that such a bit time slot is 21 $f_o$ pulses from the coefficient load pulse 399 of waveform d of FIG. 8.

In a similar manner, the 25 timing bits required for the multiplier output of waveform f of FIG. 8 are obtained. More specifically, the flip-flop 498 is set by the multiplier coefficient load pulse from AND gate 488. The AND gate 492 responds to such setting of flip-flop 498 and to the reset condition of flip-flop 481 to pass 25 $f_o$ pulses to its output terminal 496. After 25 of such $f_o$ pulses have occurred, and output pulse is generated at the output of AND gate 214'. Such output pulse is due to the $t_4$ and $T_8$ input signals thereto. More specifically, said inputs $t_4$ and $T_8$ define the $25^{th}$ bit time slot occurring after the occurrence of the multiplier coefficient load pulse.

The output of AND gate 214' is supplied to AND gate 497 which also received the 25-bit output from AND gate 492. At the $25^{th}$ output pulse, AND gate 497 becomes conductive to generate the test polarity pulse shown as pulse 398 in waveform g of FIG. 8.

Such test polarity pulse performs two functions. First, it functions to reset flip-flop 498 thus cutting off AND gate 492 and preventing any more $f_o$ pulses from passing therethrough. Second, the test polarity pulse is supplied to AND gate 213' to which is also supplied the output of full adder 223''. Reference is made to the logic diagram of FIG. 7 which shows the full adder 223' and AND gates 213 and 214.

Since the circuit is interested only in the polarity of the output of the full adder 223' in order to determine whether the next test angle increment should be added or subtracted to the difference angle being generated, only the $25^{th}$ pulse of the output of the full adder need be examined. It is to be understood that the outputs of the two multipliers 203' and 204' are supplied to the full adder 223' where they are added together. Since the outputs of both multipliers are 25 bits in length, the output of the full adder 223' is 25 bits in length and only the $25^{th}$ bit, which represents the polarity of the sum, is examined. Such examination is done by means of the AND gates 214 and 213 of FIG. 7. The output of AND gate 213 is supplied to the appropriate stage of the 17-stage polarity indicating shift register 210 of FIG. 7. As discussed above, each of the 16 data tones has allocated thereto one of the 16 data stages of shift register 210.

Thus at time $t_3$ the test polarity pulse 398 of waveform g of FIG. 8 has occurred and been stored in storage register 210 of FIG. 7. Simultaneously, the other 15 demodulators have gone through the same process and have stored a polarity indicating pulse in the appropriate stage of shift register 210.

During time period $t_3$–$t_4$ in FIG. 8, the circuit is at rest. At time $t_4$ the cycle begins anew and the 16 seven bit difference angle words stored in register 195' of FIG. 7 are supplied through full adder 194' and then into the phase-to-amplitude converters 185'' and 186'', and subsequently into the multipliers.

2. GENERATION OF TEST ANGLE INCREMENTS

As indicated in Section II–B–3, the test angle increments are supplied or added to the difference angle being generated during each recycling of the difference angle through the banks of multipliers where they are multiplied by the corresponding X and Y accumulator contents in accordance with expression (6) which also is set forth in Section II–B–3. A more detailed discussion of the generation of such test angle increments is set forth below.

As shown in waveform c of FIG. 8, test angle increments are added or subtracted to the difference angle generator 195' of FIG. 7 every other $f_s$ sampling period. These test angle increments begin with $\pi$ and follow $\pi$ successively with $\pi/2$, $\pi/4$, $\pi/8$, $\pi/16$, $\pi/32$, and $\pi/64$. Since the first circulation of the test angle words or difference angle words to the system requires the addition or subtraction of $\pi$ thereto, which produces identical results, the difference angle words in shift register 195' of FIG. 7 can all be set initially to contain $\pi$. Actually, the initial setting of these difference angle words to $\pi$ can be accomplished at the end of each phase updating function as will be described in the following section. Assume for purposes of this discussion that at time $t_o$ in FIG. 8 they have a value of $\pi$.

During the time period $t_1$–$t_4$ of FIG. 8, the difference angle words are compared with the X and Y increments of the various demodulators, and the resultant polarity indicating pulses of waveform g are stored in the bit polarity indicating shift register 210 of FIG. 7.

As can be seen from waveform c of FIG. 8, additions or subtractions of the test angle increments must be made at times $t_4$, $t_6$, $t_8$, $t_{10}$, $t_{12}$, and $t_{14}$. The logic for generating and supplying such test increments to the full adder 194' of FIG. 7 is shown in FIG. 14.

Figure 14:
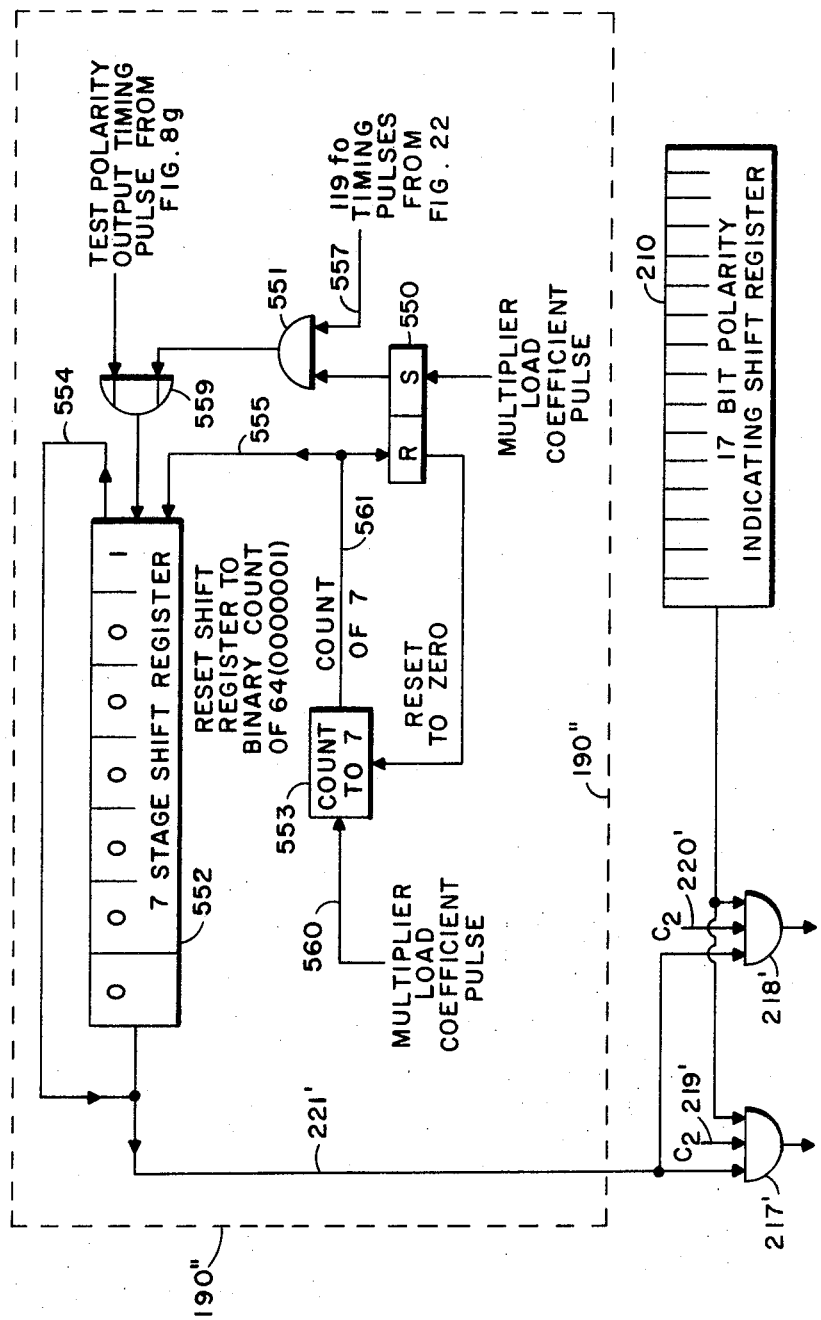
FIG. 14 is a logic diagram of the test angle increment generator.

As discussed above, during the first cycling of the difference angle word at time $t_o$ no test angle increment from the test angle generator or register 552 of FIG. 14 is required. However, during time interval $t_1$–$t_4$ the test angle increment generator 552 must be energized to generate a test angle of $\pi/2$ which will be supplied during time interval $t_4$–$t_5$ to all of the 16 difference angle words being generated.

Energization of test angle increment generator 552 is accomplished by supplying the multiplier load coefficient pulse 399 of FIG. 8d to the set side of flip-flop 550 of FIG. 14. The AND gate 551 is thereby conditioned to pass the 119 $f_o$ timing pulses from FIG. 22 to shift register 552 during the time interval $t_4$–$t_5$ of FIG. 8c when they occur. The contents of the seven stage shift register 552 will circulate 17 times to supply 17 seven-bit phase words to full adder 194' of FIG. 7, through AND gates 217' and 218', where they will combine with the seven bit difference angle phase words circulated out of shift register 195'.

As noted above, the seven stage shift register 552 of FIG. 14 contains a binary number 64, which is equivalent to $\pi$, at time $t_1$. The generation of a test angle increment $\pi/2$ for circulation during time interval $t_4$–$t_5$ is initiated by test polarity output timing pulse 398 of FIG. 8g, which is supplied through OR gate 559 of FIG. 14 to cause the data in shift register 552 to shift one stage to the left, thus changing the binary number 64 to 32, which is equivalent to $\pi/2$. Thus, at time $t_4$ when the 119 $f_o$ timing pulses are supplied to shift register 552 the binary word 0 0 0 0 1 0 = 32 will be generated.

Upon the occurrence of the test polarity pulse of 397 of FIG. 8g, which occurs between times $t_5$ and $t_6$, the contents of shift register 552 will again be shifted one stage to the left to change the number stored therein from a 32 to a 16 which is represented by the binary 0 0 0 0 1 0 0. Thus, at time $t_6$ when the contents of shift register 552 of FIG. 14 are again circulated 17 times it will supply a test angle increment $\pi/4$ to full adder 194' of FIG. 7 where said test angle increment will be added or subtracted to each of the 17 difference angle words from shift register 195' (except the difference angle word corresponding to the Doppler correction tone).

It is to be understood that the test angle increments supplied to full adder 194' of FIG. 7 are in one of two forms. More specifically, it is either in its originally generated from in which case it will add to the contents of the corresponding difference angle from register 195'; or conversely, it will be in its complement form, having been passed through the 2's complement function 192', in which case it will in effect be subtracted from its corresponding difference angle word.

In the particular logic shown in FIG. 14, the advancing of the contents of shift register 552 one stage between each cycle is accomplished by supplying the test polarity output timing pulses of FIG. 8g to the shift register between such difference angle circulation periods. Obviously, other sources can be utilized for such advancing of the contents of shift register 552. The test polarity output timing pulse is merely a convenient way of accomplishing this result.

When seven multiplier load coefficient pulses have occurred, the phase measurement operation is completed as shown in FIG. 8. To mark such a termination there is supplied in FIG. 14 a counter 553 which functions to count said multiplier load coefficient pulses supplied thereto via lead 560. At the count of seven, the counter 553 provides an output to lead 561 which performs two functions. The first function is to reset flip-flop 550, thereby disabling AND gate 551 and cutting off the supply of $f_o$ timing pulses from shift register 552.

The second function is to reset the seven stage shift registers 552 to a binary count of 64 in the form of binary word 0 0 0 0 0 0 1.

The phase measurement function is now completed for the frame of input data being received and will not be employed again until the reception of the next frame of input data.

C. PHASE UPDATE LOGIC AND TIMING

The figures relating to the phase update function are FIGS. 5, 7, 8, 9, 10, and 21. More specifically, FIG. 21 shows how the control pulse C3 is generated on output lead 414 by means of applying certain selected inputs to AND gate 416. Such operation has been described hereinbefore in detail under Section II–B–1, and in essence, functions to begin the control pulse C3 at time $t_1$ in waveform c of FIG. 10. It can be seen from such waveform that the phase reference word 543, corresponding to Doppler effect correction tone $\phi^0$, is excluded from the time interval covered by control pulse C3. Only the 16 data carrying pulses are included in such time intervals.

In FIG. 9, there is shown the logic which forms the operational part of the circuit of FIG. 7 during the C3 phase update mode. During this phase update function C3, which lasts for 16 word slot periods or 136 microseconds, which is just short of a full sampling period time of 142 microseconds, the 16 data words are supplied through full adder 194'' and AND 198'' into full adder 178'', where they are added to the corresponding 16 data bit words which are continuously generated and circulated from the phase reference signal generating register 180''.

It is to be specifically noted that the phase update control pulse C3 occurs during the last 136 microseconds of the phase measurement pulse, as can be seen from the waveform d of FIG. 5 and the waveform c of FIG. 10.

Also from FIGS. 8c and 8d it can be seen that the 17 seven bit difference angle words are being circulated therefrom and through full adder 194'' in FIG. 9. Thus the occurrence of the phase update pulse C3 merely functions to open AND gate 198'' after the circulation of the first difference angle word $\phi'_o$ from shift register 195'' so as to effectively block it from full adder 178''. During the remaining time, the remaining 16 data words are supplied up through AND gate 198'' and into full adder 178''.

Upon completion of the phase update function, the data stored in the X and Y accumulators is detected as shown during time interval $t_4$–$t_5$ in FIG. 5e. Such data detect function will be discussed in detail in the following text.

D. DATA DETECT LOGIC AND TIMING

In considering the detailed logic of the data detect function, reference will be made generally to FIGS. 4, 5, 6, and 8, and more particularly to FIGS. 11, 15, 16, 17, and 20.

From FIG. 5 it can be seen that the data detect control pulse C4 has a duration of one sampling period and occurs immediately after the phase update control pulse C3. From FIGS. 8, 11, and 20 it can be seen that a stream of 21 $f_o$ clock pulses are generated to circulate the data in the X and Y accumulators of all of the 16 data carrying tone demodulators.

The generation of the 21 bits for circulating the data in the X and Y accumulators is necessary since the capacity of the accumulators is 21 bits and further since the polarity of the quantity stored therein is contained in the $21^{st}$ (the most significant) bit of the 21 bits stored therein. It is only the polarity of the quantity stored in the X and Y accumulators during any given frame that determines the nature of the bits encoded in the associated tone during the frame being received.

Figure 15:
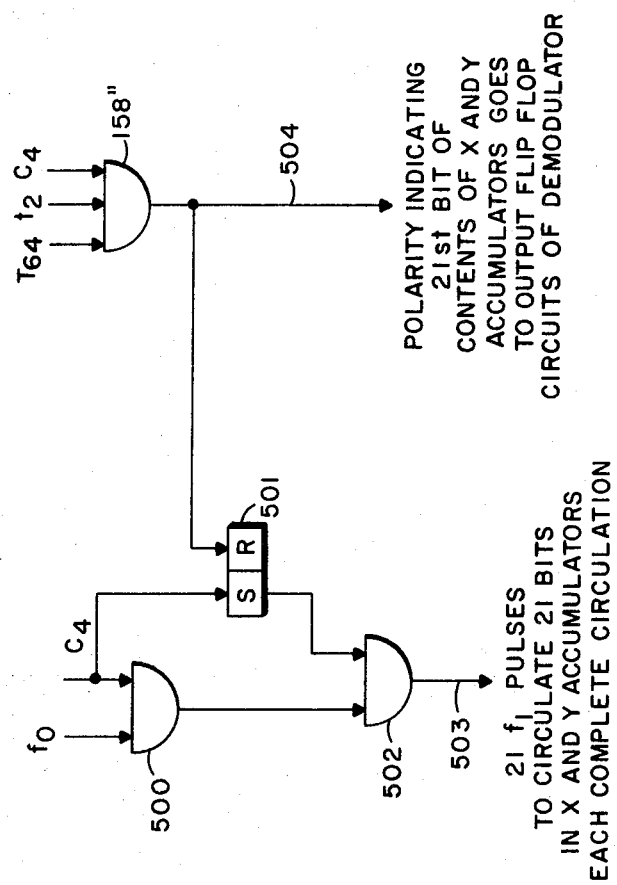
FIG. 15 is a logic diagram for certain parts of the timing required for the measurement of phase angles.

The means for sampling the $21^{st}$ bit of the accumulator as the data circulates therein during the time interval $t_0$–$t_1$ of FIG. 11d is shown in FIG. 15. More specifically, in FIG. 15 the said 21 $f_o$ timing bits are initiated by the occurrence of the C4 timing pulse upon one of the inputs to AND gate 500. Such input pulse C4 also functions to set flip-flop 501 thereby opening AND gate 502 and allowing the $f_o$ timing pulses to pass through AND gates 500 and 502 to output terminal 503.

The $21^{st}$ $f_o$ timing pulse, measured from the previously occurring sampling pulse $f_o$ at time $t_o$ in FIG. 11a, occurs coincident with the time slot of the seventh bit of the third phase word as shown at time $t_1$ of waveform d of FIG. 11. AND gate 158" in FIG. 15 is responsive to such inputs and also to control pulse C4 to supply a data detect sampling pulse on its output terminal 504 which is shown as pulse 256 in waveform e of FIG. 11.

The output of AND gate 158" of FIG. 15 also functions, at its trailing edge, to reset flip-flop 501, thus disabling AND gate 502 after the $21^{st} f_o$ timing pulse has passed therethrough.

The AND gate 158" is also shown as AND gate 158 in the general logic diagram of FIG. 4 and can be seen to enable AND gates 157 and 164 to pass the $21^{st}$ bit of the X and Y increment accumulators 156 and 163, respectively, therethrough.

The outputs of AND gates 157 and 164, which are simply positive or negative pulses indicating the polarity and the X and Y accumulators, are passed to a plurality of pairs of flip-flop circuits to form a bank of flip-flop circuits such as the bank 254 in FIG. 6. As discussed above, such a bank of flip-flop circuits is constructed to form one long shift register out of which the data, now in two level form, can be shifted therefrom in serial form at a 2,400 bit per second rate.

Figure 17:
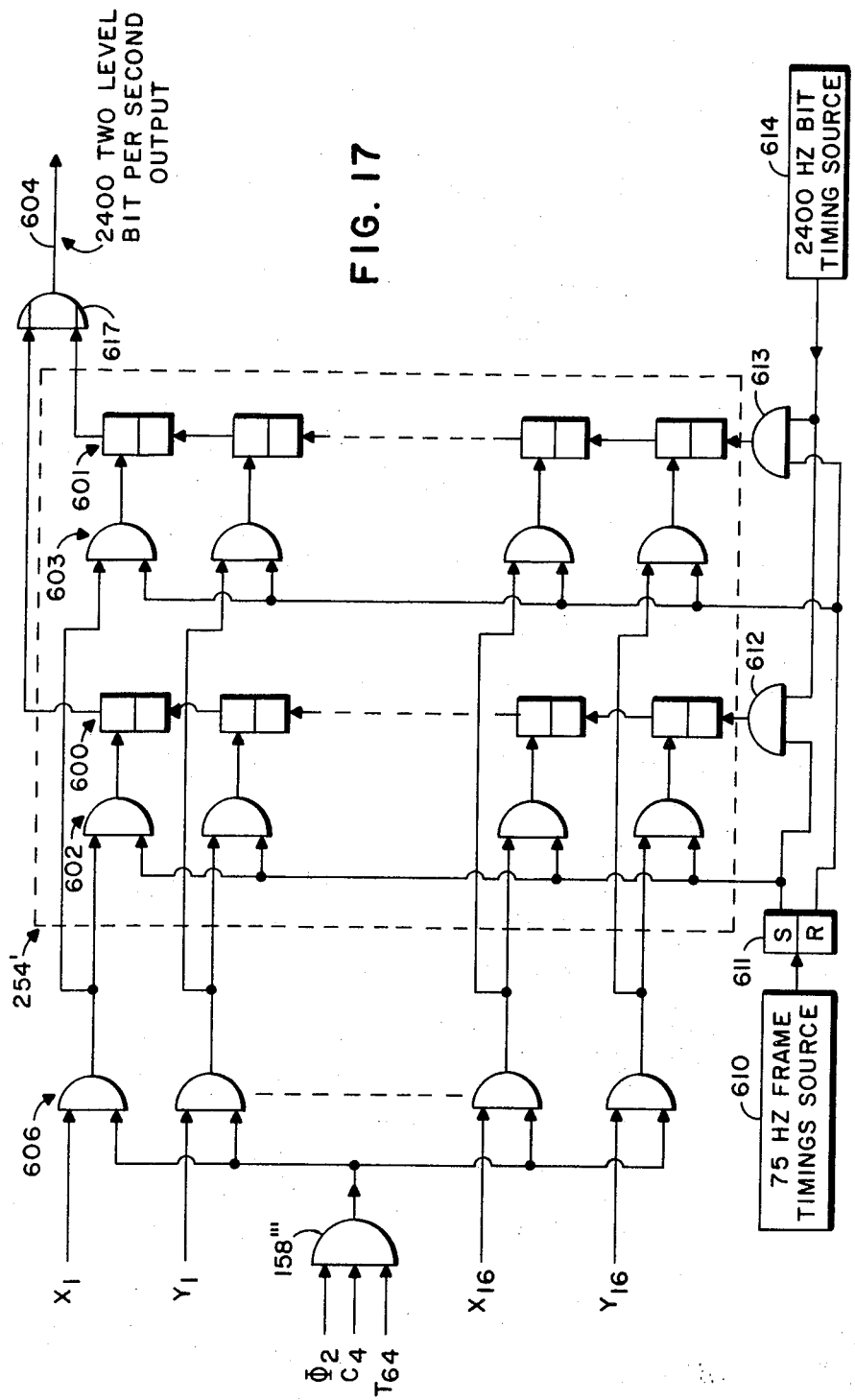
FIG. 17 is a logic diagram of the output data buffers.

Actually, the bank of flip-flop circuits 254 is more complex than shown in FIG. 6 and is shown in more detail within the block 254' of FIG. 17.

Instead of a single bank of flip-flop circuits as shown in FIG. 6, there are provided two banks of flip-flop circuits 600 and 601 in FIG. 17. These two banks of flip-flop circuits are loaded and unloaded in alternate manner. More specifically, the bank of flip-flop circuits 600 is loaded with 32 bits from the 16 demodulators associated therewith upon the occurrence of the data detect sample pulse during a first frame. During this first frame the 32 data bits stored in a bank of flip-flops 601 during the previously received frame are being unloaded serially onto output lead 604 at a 2,400 bit per second rate. Then, during the next received frame the bank of flip-flop circuits 600 is caused to be unloaded on output lead 604 at the 2,400 bit per second rate, and the 32 bits received during said next frame are entered into the bank of flip-flop circuits 601 upon the occurrence of said data detect pulse during said next frame.

Figure 16:
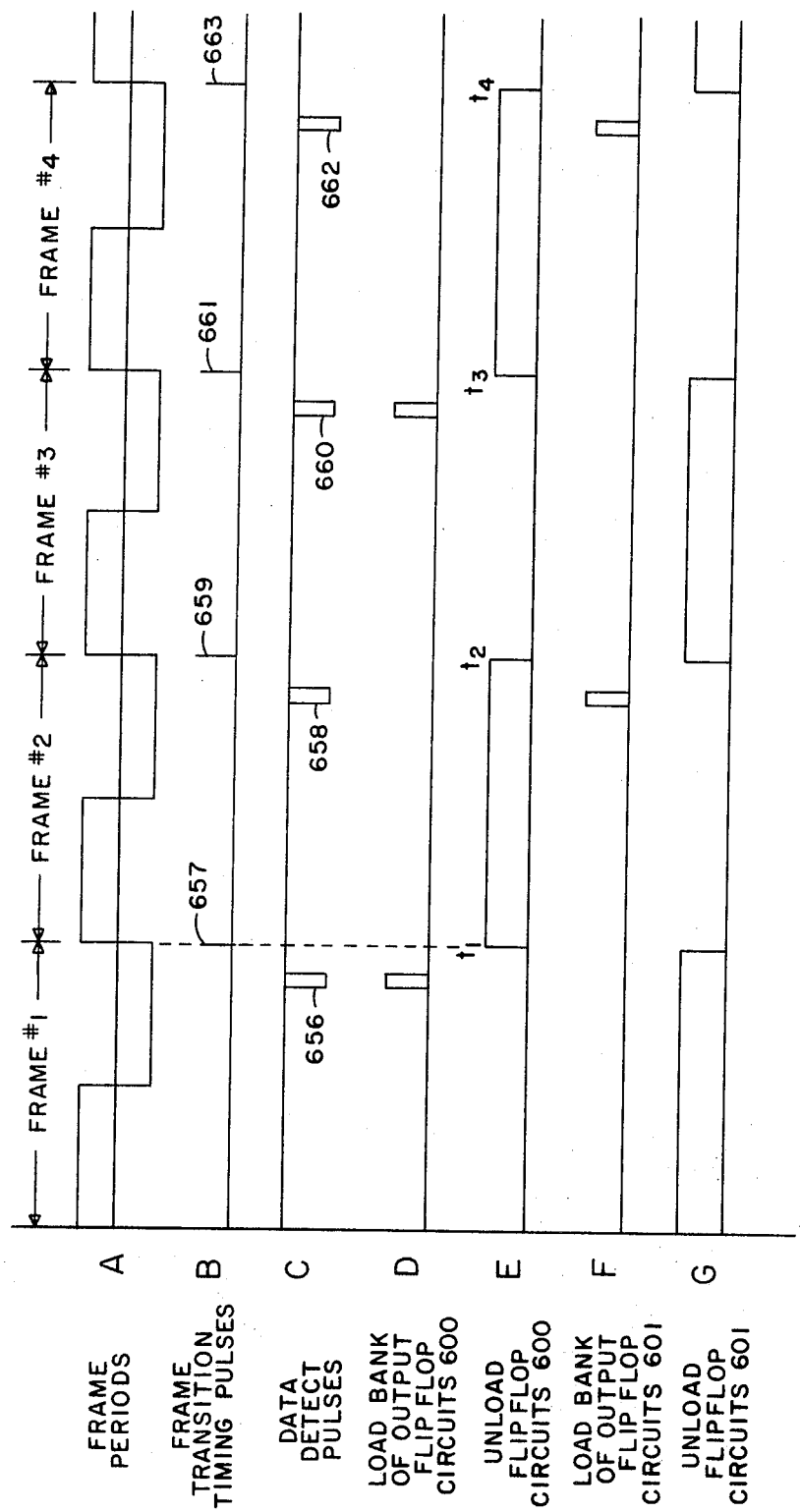
FIG. 16 is a timing diagram for the output data buffers.

The foregoing is illustrated in the waveforms of FIG. 16 wherein waveform A shows the frame periods, waveform B illustrates the frame transition timing pulses, and waveform C shows data detect pulses 656, 658, 660, and 662 of the same origin as pulse 256 of FIG. 11e.

Upon the occurrence of the data detect pulse 656 of waveform C of FIG. 16, the bank of output flip-flop circuits 600 of FIG. 17 is loaded with 32 bits from the 16 demodulators. Then subsequently upon the occurrence of the next frame transition pulse 657 said bank of flip-flop circuits 600 is unloaded during the time period $t_1-t_2$ of FIG. 16e. However, during this time period a second data detect pulse 658 of waveform C occurs, which functions to load the next received 32 bits into the bank of flip-flop circuits 601 so that upon the occurrence of the next frame transition pulse 659 the said 32 data bits stored in the bank of flip-flop circuits 601 of FIG. 17 are unloaded serially at a 2,400 bit per second rate as shown in waveform G of FIG. 16 during time period $t_2-t_3$. Similarly, upon the occurrence of subsequent data detect pulses 660 and 662 and frame transition timing pulses 661 and 663, groups of 32 data bits are stored in banks of flip-flops 600 and 601, respectively, and then transferred alternately onto output 604 of FIG. 17 terminal at a 2,400 bit per second rate and in a serial manner.

The logic for generating the aforementioned timing pulses is shown in FIG. 17. More specifically, the frame transition pulses are generated by means of timing source 610 and supplied to a single input flip-flop 611 which changes states upon the reception of each pulse. When in its set state, the flip-flop 611 functions to enable the bank of AND gates 602 and to disable the bank of AND gates 603. When in its reset state the flip-flop 611 functions to do the reverse; i.e., to enable the bank of AND gates 603 to disable the banks of AND gates 602. Thus the 32 data bits supplied through the bank of AND gates 606 from the 16 tone demodulators upon the occurrence of a data detect pulse from AND gate 158" will be supplied alternately into the two banks of flip-flops 600 and 601 through the banks of AND gates 602 and 603, respectively.

The two AND gates 612 and 613 are also conditioned to be enabled by the output of flip-flop 611, but in an inverted manner, time-wise, however. More specifically, when the bank of AND gates 602 is enabled, AND gate 612 is disabled so that the 2,400 Hz timing signal from source 614 cannot pass therethrough. On the other hand, during this same time period the bank of AND gate 603 will be disabled but AND gate 613 will be enabled so that the 2,400 Hz timing source will pass therethrough into the bank of flip-flop circuits 601. Now, as discussed above, said bank of flip-flop circuits 601 is constructed to form one long shift register having 32 stages therein, with each stage holding one of the 32 bits from the 16 tone demodulators. Thus, the 2,400 Hz timing signal will function to shift the data out of the bank of flip-flop circuits 601 through the OR gate 617 and then to output lead 604 at a 2,400 bit per second rate.

During the next frame, AND gate 613 is disabled and AND gate 612 is enabled. Also during said next frame, the bank of AND gates 602 is disabled and the bank of AND gates 603 is enabled. Thus the data stored in the bank of flip-flop circuits 600 can be shifted therefrom at a 2,400 bit per second rate during said next frame, while the currently received 32 bits are being stored in the bank of flip-flop circuits 601.

All 16 pairs of X and Y accumulators are reset with the data sample pulse (FIG. 11e), thus preparing them for the data drive interval during the next data frame.

While the present invention has been described in conjunction with a particular received signal from a particular modulator, the concept relates broadly to a digitally implemented demodulator for detecting a differentially coherent phase shift keyed signal using substantially the same circuitry for both filtering the received signal and for measuring the phase interval between time adjacent portions of the signal as described in the appended claims.

I claim:

1. The method of detecting the phase shift of a given frequency received signal comprising the steps of:
    generating a local reference signal of said given frequency;
    phase shifting the local reference signal to produce in-phase and quad-phase components;
    multiplying said in-phase and quad-phase components by said received signal to obtain X and Y product components of the received signal with respect to the local reference signal;
    storing the product of the multiplication in X and Y registers;
    multiplying the quadrature components of a $\pi$ radians phase test angle by the product components stored in the X and Y registers;
    subtracting one product from the other
    adding a lesser positive or negative radian magnitude to the phase of the test angle signal in accordance with the polarity of the subtraction difference;
    repeating the multiplication, subtraction, and addition N times to a desired degree of phase measurement accuracy for obtaining a final test angle signal; and
    updating the phase of the local reference signal by the test angle signal.

2. The method of detecting the phase shift of a received data signal with respect to a past data period comprising the steps of:
    detecting first and second phase components of a received signal with respect to a reference signal;
    generating a digital number updating signal by comparing and adjusting the phase of a test signal with the detected phase components of said received signal; and digitally adding said updating signal to a digital number representation of said reference signal for updating said digital number representation of said reference signal converting said digital number representation of said reference signal from a phase to amplitude signal to produce said reference signal in updated form for detecting further input phase shift data.

3. The method of claim 2 wherein the generation of the updating signal comprises the following steps repeatedly and sequentially N times:

multiplying a given test angle by the first and second components;

subtracting one product from the other;

modifying the phase of said test angle in accordance with the polarity of the difference result of the subtraction.

4. Apparatus for detecting the phase shift of a received signal with respect to the phase of a periodically phase updated reference signal comprising, in combination:

reference means for providing a periodically digital number updated reference angle signal;

phase to amplitude signal conversion means connected to said reference means to provide said periodically phase updated signal;

input means for supplying a received signal to be phase detected;

detection means, connected to said input means and said conversion means, for supplying two phase separated component signals indicative of the phase of the input signal with respect to the reference angle;

first and second storage means for temporarily storing the two phase-separated signals;

test angle generating means, connected to said storage means, for providing a first digital number signal indicative of the phase angle of the received signal; and updating means connected to said generating means and said reference means for updating the digital number reference angle signal by the amount of said first signal from said generating means.

5. Apparatus as claimed in claim 4 comprising, in addition output means for providing a second signal indicative of the phase shift of the received signal with respect to the previously received signal.

6. Apparatus as claimed in claim 4 wherein the two-phase separated signals of said detection means are separated by 90 degrees and include polarity bits and comprising, in addition, output means for determining the phase shift of said input signal in accordance with two polarity bits of said phase separated signals.

7. Apparatus as claimed in claim 4 for detecting a plurality of N tones comprising in addition:

N detection means;

means for storing N periodically updated reference signals to be retrieved sequentially for use with each detection means in sequence; and means for sequentially connecting said test angle generating means and said updating means to said N detection means and said reference means respectively to determine the angle of each of the N tone received signals and then to update the respective reference angle signal corresponding to that tone.

8. Apparatus as claimed in claim 4 wherein said test angle generating means comprises:

means for supplying a test angle $\alpha$;

means for multiplying and subtracting the two phase-separated signals by said variable test angle $\alpha$ in accordance with $$P = Y \cos\alpha - X \sin\alpha$$

where P is the polarity of the answer and X and Y are the phase-separated signals and are separated by 90° and supplying the signal P for N times; and means for modifying the test angle $\alpha$ in accordance with the polarity of P each of N times.

9. Apparatus for detecting the phase shift of a received data signal with respect to a past data period comprising, in combination:

means for detecting the phase of a received signal with respect to a reference signal and supplying an output indicative thereof;

means, connected to said last named means, for generating a phase representative digital number updating signal by comparing and adjusting the phase of a test angle signal with the detected phase components obtained by the last named means;

means for digitally adding said updating signal to a digital number representation of said digital number representation of reference signal for updating said reference signal means for converting said digital number representation of said reference signal from a phase to amplitude signal to produce said reference signal in updated form for detecting further input phase shift data.

10. The apparatus recited in claim 9 wherein the means for generating the updating signal comprises:

mean for multiplying the test angle signal by first and second components of the received signal;

means for subtracting one product from the other; and means for modifying the phase of said test angle signal in accordance with the polarity of the difference result of the subtraction.

11. Apparatus as recited in claim 10 wherein the test angle originally supplied by said means for multiplying is $\pi$ radians and where the means for modifying the test angle changes the angle by one-half the previous change starting with $\pi/2$.

12. The method of updating a digital number representation of a reference angle signal utilized in a digital system for demodulating a phase variant signal wherein the reference angle signal is updated prior to each detection period comprising the steps of:

supplying a digital number representation of a reference angle signal;

measuring the angle of the output detected signal wherein the measurement result is a digital number directly indicative of the phase angle as a percentage of a full cycle of 360 electrical degrees; and adding the result in digital number form to the previous representation of a reference angle signal also expressed as a digital number which is directly indicative of the phase angle as a percentage of said full cycle, phase to amplitude signal converting of said digital number representation of said reference angle signal to provide said reference angle signal.

13. Demodulating apparatus comprising, in combination:

first means for supplying an input signal to be demodulated;

second means for supplying a reference signal at an output thereof wherein said second means includes input means to accept phase updating correction signals;

first and second detection means, connected to said first and second means, for supplying two 90° phase separated digital signals indicative of the quadrature components of the input signal with respect to said reference signal;

first and second storage means for storing the output signals from said first and second detection means respectively wherein the stored signal is a digital signal directly indicative of the phase angle of said input signal with respect to said reference and to a full 360° electrical cycle;

third means for supplying periodic and sequentially smaller test angle signals for phase measurement purposes;

fourth means for storing the accumulated test angle;

fifth means, connected to said third and fourth means for passing signals from said third to said fourth means, and for incrementing the test angle signal phase magnitude stored in said fourth means in accordance with the polarity of an input supplied thereto;

comparison means, connected to said fourth means and said first and second storage means, for comparing the output signals stored in said first and second storage means with the signal stored in said fourth means and supplying an output signal to said fifth means indicative in polarity of the comparison result; and sixth means for supplying a signal to said input means of said second means indicative of the final accumulated test angle stored in said fourth means for phase updating the reference signal in said second means.

* * * * *

UNITED STATES PATENT OFFICE
CERTIFICATE OF CORRECTION

Patent No. 3,675,129                    Dated July 4, 1972

Inventor(s) William J. Melvin

It is certified that error appears in the above-identified patent and that said Letters Patent are hereby corrected as shown below:

Column 1, line 13, delete "one" and substitute therefor --tone--
Column 4, line 18, delete "presented" and substitute therefor --represented--
Column 5, line 13, delete "One" and substitute therefor --On--
Column 13, line 2, delete "phase-tomamplitude" and substitute therefor --phase-to-amplitude--
Column 14, line 57, delete "ash" and substitute therefor --dash--
Column 15, line 51, delete "$E_{in} \sin\phi AHin = Y$" and substitute therefor --$E_{in}\sin\phi_{in} = Y$--
Column 15, line 55, delete "$E_{in}\cos\phi AYin = X$" and substitute therefor --$E_{in}\cos\phi_{in} = X$--
Column 19, line 24, delete "AND" and substitute therefor --Therefore--
Column 19, line 27, delete "y" and substitute --Y--
Column 19, line 30, delete "and" first occurrence and substitute therefor --AND--
Column 19, line 55, before the heading insert --III--
Column 24, line 63, delete "π14" and substitute therefor --π/4--
Column 25, line 52, delete "from" and substitute therefor --form--
Column 26, line 16, delete "$\phi^0$" and substitute therefor --$\phi_0$--
Column 26, line 75, delete "$f_o$" and substitute therefor --$f_s$--
Column 27, line 16, delete "and" and substitute therefor --$\delta f$--
Column 28, line 4, delete "158' '  " and substitute therefor --158'''--
Column 30, claim 9 as written is not in accordance with the Examiner's amendment and should be written as follows:

9. Apparatus for detecting the phase shift of a received data signal with respect to a past data period comprising, in combination:

means for detecting the phase of a received signal with respect to a reference signal and supplying an output indicative thereof;

means, connected to said last named means, for generating a phase representative digital number updating signal by comparing and adjusting the phase of a test angle signal with the detected phase components obtained by the last named means;

UNITED STATES PATENT OFFICE
CERTIFICATE OF CORRECTION

Patent No. 3,675,129                Dated July 4, 1972

Inventor(s) William J. Melvin            - 2 -

It is certified that error appears in the above-identified patent and that said Letters Patent are hereby corrected as shown below:

means for digitally adding said updating signal to a digital number representation of said reference signal for updating said digital number representation of reference signal; and means for converting said digital number representation of said reference signal from a phase to amplitude signal to produce said reference signal in updated form for detecting further input phase shift data.

Signed and sealed this 19th day of December 1972.

(SEAL)
Attest:

EDWARD M. FLETCHER, JR.           ROBERT GOTTSCHALK
Attesting Officer                   Commissioner of Patents